(12) United States Patent
John et al.

(10) Patent No.: US 11,919,640 B2
(45) Date of Patent: Mar. 5, 2024

(54) UNMANNED AIRCRAFT

(71) Applicant: Panasonic Intellectual Property Management Co., Ltd., Osaka (JP)

(72) Inventors: Stephen William John, Nara (JP); Kazunobu Konishi, Osaka (JP); Katsuhiko Asai, Nara (JP); Shunsuke Kuhara, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 263 days.

(21) Appl. No.: 17/546,285

(22) Filed: Dec. 9, 2021

(65) Prior Publication Data

US 2022/0097850 A1 Mar. 31, 2022

Related U.S. Application Data

(63) Continuation of application No. PCT/JP2020/022737, filed on Jun. 9, 2020.

(30) Foreign Application Priority Data

Jul. 8, 2019 (JP) ................. 2019-126737

(51) Int. Cl.
*B64C 39/02* (2023.01)
*B64U 10/13* (2023.01)
(Continued)

(52) U.S. Cl.
CPC .......... *B64C 39/024* (2013.01); *G05D 1/005* (2013.01); *G05D 1/0094* (2013.01); *G05D 1/101* (2013.01);
(Continued)

(58) Field of Classification Search
CPC .... B64C 39/024; G05D 1/005; G05D 1/0094; G05D 1/101; B64U 2201/10; B64U 10/13;
(Continued)

(56) References Cited

U.S. PATENT DOCUMENTS 10,068,489 B2   9/2018 Brown et al.
2016/0063987 A1* 3/2016 Xu .................. G10K 11/17881
                                                  381/71.14
2019/0333494 A1* 10/2019 Park ..................... H04R 1/406

FOREIGN PATENT DOCUMENTS

EP    3470336       4/2019
JP    2017-502568   1/2017
WO    2016/029469   3/2016

OTHER PUBLICATIONS

International Search Report (ISR) dated Sep. 8, 2020 in International (PCT) Application No. PCT/JP2020/022737.

* cited by examiner

*Primary Examiner* — Paul Kim
(74) *Attorney, Agent, or Firm* — Wenderoth, Lind & Ponack, L.L.P.

(57) ABSTRACT

An unmanned aircraft includes: a microphone including a plurality of elements; and a processor that processes signals output from target elements included in the plurality of elements. In the unmanned aircraft, the processor performs a detection process of detecting a target sound signal of a target sound from the signals output from the target elements included in the plurality of elements, and changes the target elements that output the signals to be processed by the processor to select at least one target element that outputs a signal to be processed by the processor from among the plurality of elements, in accordance with a result of the detection process.

10 Claims, 17 Drawing Sheets

(51) Int. Cl.
    *B64U 30/20*      (2023.01)
    *B64U 50/19*      (2023.01)
    *G05D 1/00*       (2006.01)
    *G05D 1/10*       (2006.01)
(52) U.S. Cl.
    CPC .............. *B64U 10/13* (2023.01); *B64U 30/20* (2023.01); *B64U 50/19* (2023.01); *B64U 2201/10* (2023.01)
(58) Field of Classification Search
    CPC ...... B64U 30/20; B64U 50/19; G10K 11/178; G10L 21/0208; G10L 25/51; H04R 1/406; H04R 2201/401; H04R 2410/01; H04R 2430/20; H04R 2499/13
    USPC ........................................................ 381/71.1
    See application file for complete search history.

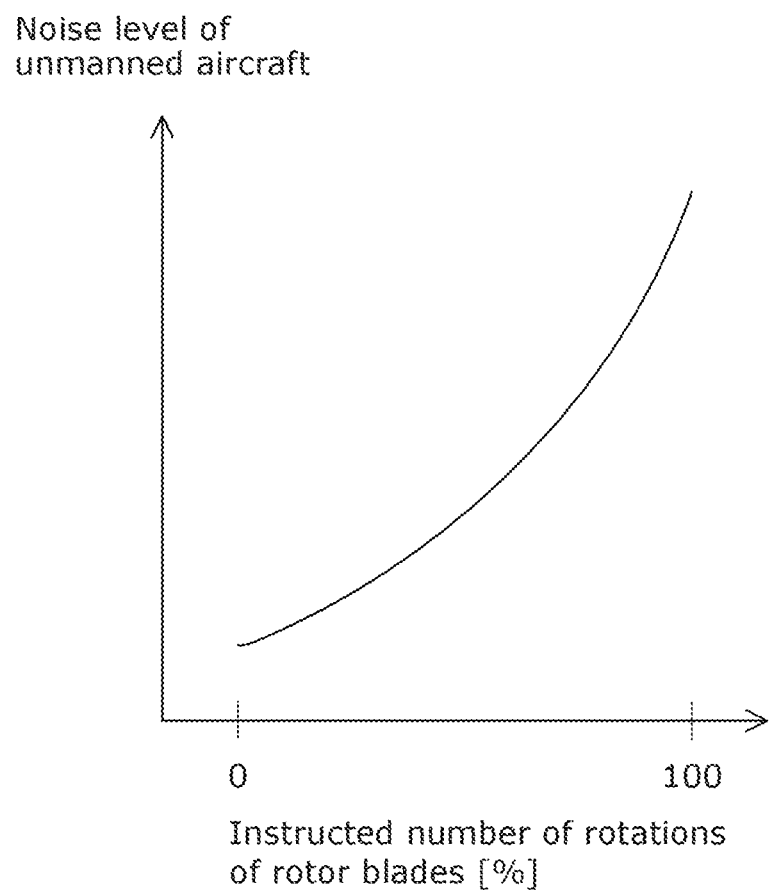

UNMANNED AIRCRAFT

CROSS REFERENCE TO RELATED APPLICATIONS

This is a continuation application of PCT International Application No. PCT/JP2020/022737 filed on Jun. 9, 2020, designating the United States of America, which is based on and claims priority of Japanese Patent Application No. 2019-126737 filed on Jul. 8, 2019. The entire disclosures of the above-identified applications, including the specifications, drawings and claims are incorporated herein by reference in their entirety.

FIELD

The present disclosure relates to an unmanned aircraft.

BACKGROUND

Patent Literature (PTL) 1 discloses an unmanned aerial vehicle that performs a process of removing the background noise from sound data picked up by a background microphone.

CITATION LIST

Patent Literature

PTL 1: Japanese Unexamined Patent Application Publication (Translation of PCT Application) No. 2017-502568

SUMMARY

Technical Problem

It is difficult for such an unmanned aircraft to incorporate a large-capacity battery. The amount of power used for processing in the unmanned aircraft is thus desired to be reduced.

In view of this, the present disclosure provides an unmanned aircraft that achieves both the reduction in power consumption in the unmanned aircraft and the detection of a target sound.

Solution to Problem

The unmanned aircraft according to the present disclosure includes: a microphone including a plurality of elements; and a processor that processes signals output from target elements included in the plurality of elements. Here, the processor: performs a detection process of detecting a target sound signal of a target sound from the signals output from the target elements included in the plurality of elements; and changes the target elements that output the signals to be processed by the processor to select at least one target element that outputs a signal to be processed by the processor from among the plurality of elements, in accordance with a result of the detection process.

The unmanned aircraft according to another aspect of the present disclosure includes: a microphone including a plurality of elements; and a processor that processes signals output from target elements included in the plurality of elements. Here, the processor: obtains an aircraft state of the unmanned aircraft; and changes the target elements that output the signals to be processed by the processor to select at least one target element that outputs a signal to be processed by the processor from among the plurality of elements, in accordance with the aircraft state.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects

The unmanned aircraft according to the present disclosure is capable of achieving both the reduction in power consumption in the unmanned aircraft and the detection of a target sound.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 19 is a graph showing a relation between a noise level of the unmanned aircraft and an instructed number of rotations of rotor blades.

FIG. 20 is a diagram showing a relation between an instructed number of rotations of the rotor blades of the unmanned aircraft and the number of target elements.

DESCRIPTION OF EMBODIMENTS

Figure 1:
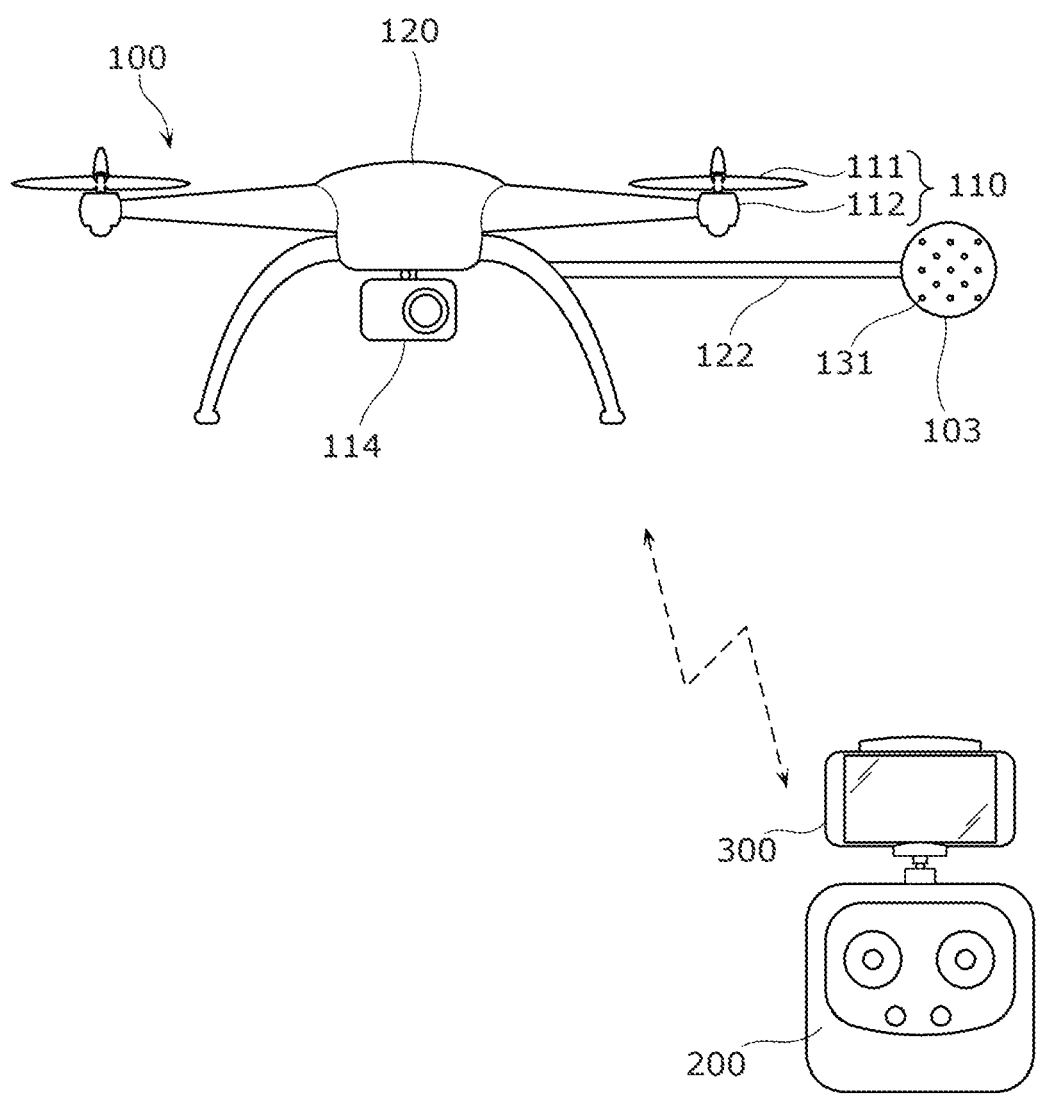
FIG. 1 is an external view of an unmanned aircraft and a controller according to Embodiment 1.

Underlying Knowledge Forming Basis of the Present Disclosure

As described above, the unmanned aerial vehicle disclosed in PTL 1 performs the signal processing of removing, from the obtained sound data, the background noise generated by propulsion units such as rotor blades included in the unmanned aerial vehicle. However, the inventors have found that the unmanned aerial vehicle disclosed in the Background section fails to consider the selection of elements that output signals to be processed from among elements of a plurality of microphones included in the unmanned aerial vehicle. For this reason, the unmanned aerial vehicle disclosed in PTL 1 may not be able to reduce a sufficient amount of power required for a detection process that is performed using signals output from a plurality of elements.

The unmanned aerial vehicle obtains thrust to fly by driving a plurality of rotor blades, using the power of a battery included in the unmanned aerial vehicle. As such, flight hours (or the flight distance) of the unmanned aerial vehicle are restricted by hours (or distance) determined by the amount of battery charge. The unmanned aerial vehicle uses the battery power to perform the foregoing signal processing. This means that the amount of power that can be used for the flight of the unmanned aerial vehicle decreases with an increase in the amount of power consumed by the signal processing. This results in the reduction in future flight hours of the unmanned aerial vehicle. One possible way to reduce power consumption to prevent a decrease in flight hours is to stop the signal processing. However, the unmanned aerial vehicle cannot detect a target sound by the microphones while the signal processing is stopped.

As thus described, it is hard for the conventional unmanned aircraft to achieve both the reduction in power consumption in the unmanned aircraft and the detection of a target sound.

To solve such problem, the unmanned aircraft according to an aspect of the present disclosure includes: a microphone including a plurality of elements; and a processor that processes signals output from target elements included in the plurality of elements. Here, the processor: performs a detection process of detecting a target sound signal of a target sound from the signals output from the target elements included in the plurality of elements; and changes the target elements that output the signals to be processed by the processor to select at least one target element that outputs a signal to be processed by the processor from among the plurality of elements, in accordance with a result of the detection process.

In this configuration, the processor changes target elements that output signals to be processed by the processor, in accordance with the result of the detection of a target sound signal. This means that the processor does not perform the detection process using signals output from some of the elements at least before or after changing of the target elements. With this, it is thus possible to reduce processing load required for the detection process at least before or after changing of the target elements, thereby reducing the amount of power used for the detection process. The foregoing configuration is thus capable of achieving both the reduction in power consumption in the unmanned aircraft and the detection of a target sound.

The processor may increase a current number of the target elements that output the signals to be processed by the processor, when the target sound signal is detected by the detection process from the signals output from the plurality of elements.

With this configuration, it is possible to use a smaller number of target elements before the detection of the target sound signal than the number of target elements used after the detection of the target sound signal. With this, it is possible to reduce the amount of power used to process signals output from the microphone, while continuing the detection of the target sound. Also, since an increased number of target elements are used after the detection of the target sound signal, it is possible to improve the quality of the result of processing signals output from the microphone.

The unmanned aircraft according to another aspect of the present disclosure includes: a microphone including a plurality of elements; and a processor that processes signals output from target elements included in the plurality of elements. Here, the processor: obtains an aircraft state of the unmanned aircraft; and changes the target elements that output the signals to be processed by the processor to select at least one target element that outputs a signal to be processed by the processor from among the plurality of elements, in accordance with the aircraft state.

In this configuration, the processor changes target elements that output signals to be processed by the processor, in accordance with the aircraft state of the unmanned aircraft. This means that the processor does not perform the detection process using signals output from some of the elements at least before or after changing of the target elements. With this, it is thus possible to reduce processing load required for the detection process at least before or after changing of the target elements, thereby reducing the amount of power used for the detection process.

The unmanned aircraft may further include: a rotor blade used for flight. Here, the aircraft state may be a current number of rotations of the rotor blade per unit time.

With this configuration, it is possible to select, as target elements that output signals to be processed by the processor, elements appropriate for the number of rotations of the rotor blades per unit time in accordance with such number of rotations. The foregoing configuration thus improves the quality of the result of processing signals output from the microphone.

The processor may increase a current number of the target elements in changing the target elements, and before the changing of the target elements, the target elements may include a first element located in a specific direction from the microphone.

In this configuration, before the number of target elements is increased, i.e., when a detection process is not performed using signals output from some of the elements, a detection process is performed using a signal output from the first element located in a specific direction from the microphone. This configuration thus improves the recording quality of the sound from a specific direction.

The specific direction may be a direction in which a sound source of the target sound is predicted to be located.

With this configuration, it is possible to improve the recording quality of the sound from the sound source.

Before the changing of the target elements, the target elements may further include a second element located closer to a source of noise generated by the unmanned aircraft than the first element.

In this configuration, the first element and the second element are located at different distances from the source of noise generated by the unmanned aircraft. As such, time differences are likely to occur between elements in picking up of the noise. This thus effectively reduces the noise generated by the unmanned aircraft in the detection process, thereby preventing the recording quality of the target sound from being degraded by the noise generated by the unmanned aircraft. This configuration is thus capable of improving the recording quality of the target sound.

Before the changing of the target elements, the target elements may further include a third element located between the first element and the second element.

In this configuration, the first element, the second element, and the third element are located at different distances from the source of the noise generated by the unmanned aircraft. As such, time differences are likely to occur among elements in picking up of the noise. This thus effectively reduces the noise generated by the unmanned aircraft in the detection process, thereby preventing the recording quality of the target sound from being degraded by the noise generated by the unmanned aircraft. This configuration is thus capable of improving the recording quality of the target sound.

In changing the target elements, the processor may further change the target elements to select the at least one target element that outputs the signal to be processed by the processor from among the plurality of elements, in accordance with an amount of remaining battery of a battery included in the unmanned aircraft.

In this configuration, the number of target elements is decreased when, for example, the amount of remaining battery becomes lower than a predetermined threshold after being consumed by flight, signal detection processing, and so forth. With this, it is possible to reduce the amount of power used for signal processing. This reduces the decrease rate of the amount of remaining battery, thus increasing the flight hours of the unmanned aircraft.

In this configuration, the number of target elements is increased when, for example, the amount of remaining battery becomes greater than a predetermined threshold as a result of charging, etc. This configuration is thus capable of improving the recording quality.

The processor may further: obtain a flight route of the unmanned aircraft; and estimate the amount of remaining battery in a position on the flight route at which the unmanned aircraft is scheduled to arrive.

With this configuration, it is possible to change the target elements in accordance with the amount of remaining battery estimated from the flight route. As such, it is possible, for example, to reduce the decrease rate of the amount of remaining battery by decreasing the number of target elements in the case where the amount of remaining battery is smaller than a predicted amount of power consumption that is predicted to be consumed to complete the flight through the flight route. The foregoing configuration is thus capable of increasing the flight hours of the unmanned aircraft. Meanwhile, in the case where the amount of remaining battery is larger than a predicted amount of power consumption that is predicted to be consumed, it is possible to increase the number of target elements to a larger number than for the case where the amount of remaining battery is smaller than a predetermined amount of remaining battery. This improves the recording quality.

The processor may: estimate a quality of the target sound signal that is detected from the signal output from the at least one target element that has been selected in the changing of the target elements; and change the flight route when the quality is lower than a threshold.

With this configuration, it is possible to allocate to signal processing the amount of power required to fly through the flight route that has been changed to have a shorter flight distance, for example, in the case where the quality of the target sound signal is estimated to be lower than the threshold. The foregoing configuration is thus capable of increasing the number of target elements, and thus improving the quality of the target sound signal.

The processor may: estimate a quality of the target sound signal that is detected from the signal output from the at least one target element that has been selected in changing the target elements; and increase a current number of the target elements to increase the quality to a level greater than or equal to the threshold, when the quality is lower than the threshold.

With this configuration, it is possible to increase the number of target elements in the case where the quality of the target sound signal is estimated to be lower than the threshold, thus improving the quality of the target sound signal.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, elements, the arrangement and connection of the elements, steps, the processing order of the steps etc. shown in the following exemplary embodiments are mere examples, and therefore do not limit the scope of the appended Claims and their equivalents. Therefore, among the elements in the following exemplary embodiments, those not recited in any one of the independent claims are described as optional elements.

Embodiment 1

With reference to FIG. 1 through FIG. 12, Embodiment 1 will be described.

Configuration

Figure 2:
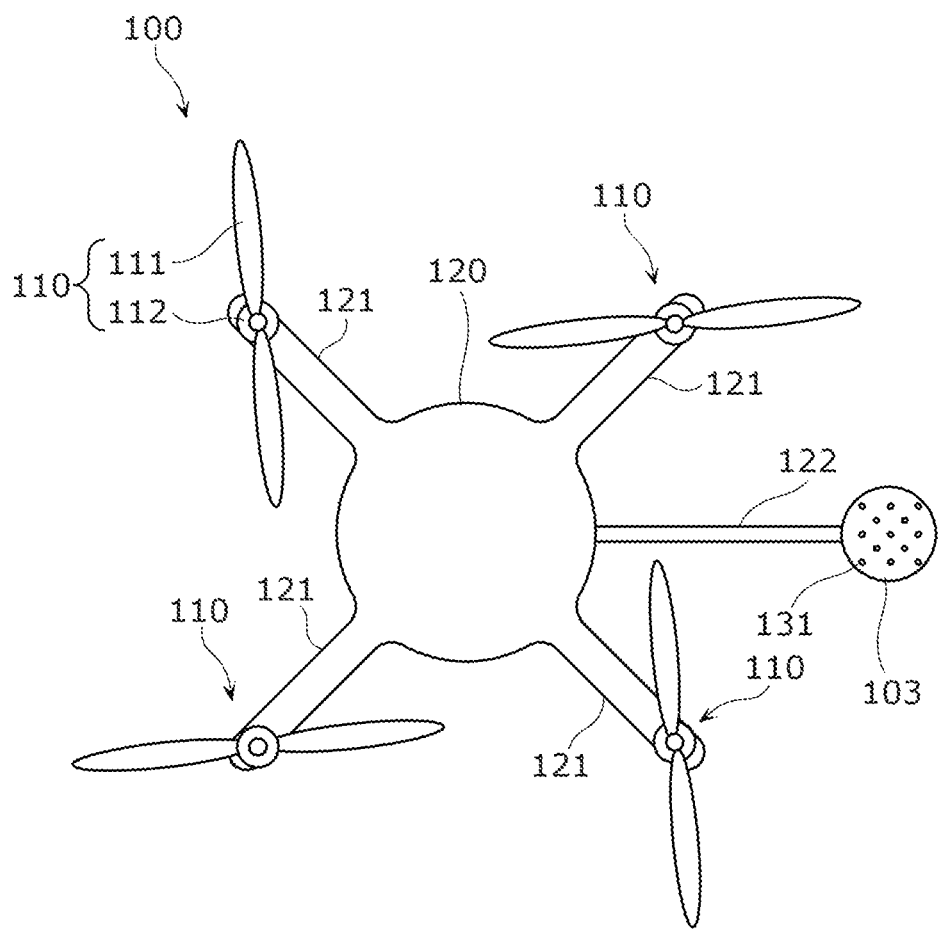
FIG. 2 is a top view of the unmanned aircraft according to Embodiment 1.

FIG. 1 is an external view of an unmanned aircraft and a controller according to Embodiment 1. FIG. 2 is a top view of the unmanned aircraft according to Embodiment 1.

As shown in FIG. 1 and FIG. 2, unmanned aircraft 100 receives, from controller 200, an operation signal corresponding to an input of a user operation to controller 200 (hereinafter also referred to as "operation"). Unmanned aircraft 100 flies in accordance with the received operation signal. Unmanned aircraft 100 may capture images mid-flight by camera 114 included in unmanned aircraft 100, in accordance with the received operation signal. Images captured by camera 114 may be sent to controller 200 or a mobile terminal such as a smartphone.

Controller 200 accepts an operation from the user, and sends to unmanned aircraft 100 an operation signal corresponding to the received operation. Controller 200 includes display 300. Display 300 displays, for example, the captured images received from unmanned aircraft 100. Note that controller 200 may be connected to a mobile terminal such as a smartphone, thereby enabling the use of the display of such mobile terminal as display 300.

This configuration enables the user to operate controller 200 to change the aircraft state of unmanned aircraft 100, which is at least one of the in-flight position or attitude of unmanned aircraft 100, while checking in real time the images captured by camera 114 of unmanned aircraft 100 on display 300 of controller 200. The user can thus freely change the imaging area of image capturing performed by camera 114 of unmanned aircraft 100.

Unmanned aircraft 100 includes four generators 110, main body 120, and four arms 121.

Each of four generators 110 generates thrust to fly unmanned aircraft 100. More specifically, each of four generators 110 produces an airflow to generate thrust to fly unmanned aircraft 100. Each of four generators 110 includes rotor blade 111 that produces an airflow by rotating, and actuator 112 that rotates rotor blade 111. Each rotor blade 111 and actuator 112 include an axis of rotation that is substantially parallel in the vertical direction and produce an airflow that flows downward from rotor blade 111 by rotating about the axis of rotation. This configuration enables four generators 110 to produce thrust that levitates unmanned aircraft 100 upward, allowing unmanned aircraft 100 to fly. Each actuator 112 is, for example, a motor that rotates about the axis of rotation of rotor blade 111.

In a top view of unmanned aircraft 100, four generators 110 are arranged around main body 120 at 90-degree intervals, with the center of gravity of main body 120 serving as the center. Stated differently, four generators 110 are arranged in a ring form to surround main body 120.

Note that rotor blade 111 included in each of four generators 110 is illustrated as a single propeller as a non-limited example, and thus rotor blade 111 may be implemented as counter-rotating propellers that includes two propellers that rotate in counter directions about the same axis of rotation. Also note that the number of generators 110 may be less than four, or may be five or more so long as thrust to fly unmanned aircraft 100 is obtained.

Main body 120 is, for example, a boxy member in a substantially circular cylindrical shape, i.e., a cabinet. Electrical components such as a processor, a memory, a battery, and various sensors are located inside of main body 120. Note that the shape of main body 120 is not limited to a circular cylindrical shape, and thus may be another shape such as a quadrangular prism.

Camera 114 and microphone 103 are located outside of main body 120. Microphone 103 is, for example, a directional microphone including a plurality of elements 131 for sound pickup. In a top view of unmanned aircraft 100, microphone 103 is fixed at the tip of arm portion 122 that extends toward a position between two adjacent generators 110 of four generators 110 that are arranged in a ring form to surround main body 120. Stated differently, microphone 103 is located, for example, facing a direction that is 45 degrees off main body 120 relative to the direction toward one of four generators 110. Arm portion 122 extends, for example, in a direction ahead of unmanned aircraft 100. As such, microphone 103 is fixed to main body 120, facing the direction ahead of unmanned aircraft 100.

Four arms 121 are members that extend from main body 120 toward four generators 110. Four generators 110 are fixed at the tips of the respective four arms 121. Stated differently, each of four arms 121 has one end fixed to main body 120, and the other end fixed to the corresponding one of four generators 110.

Figure 3:
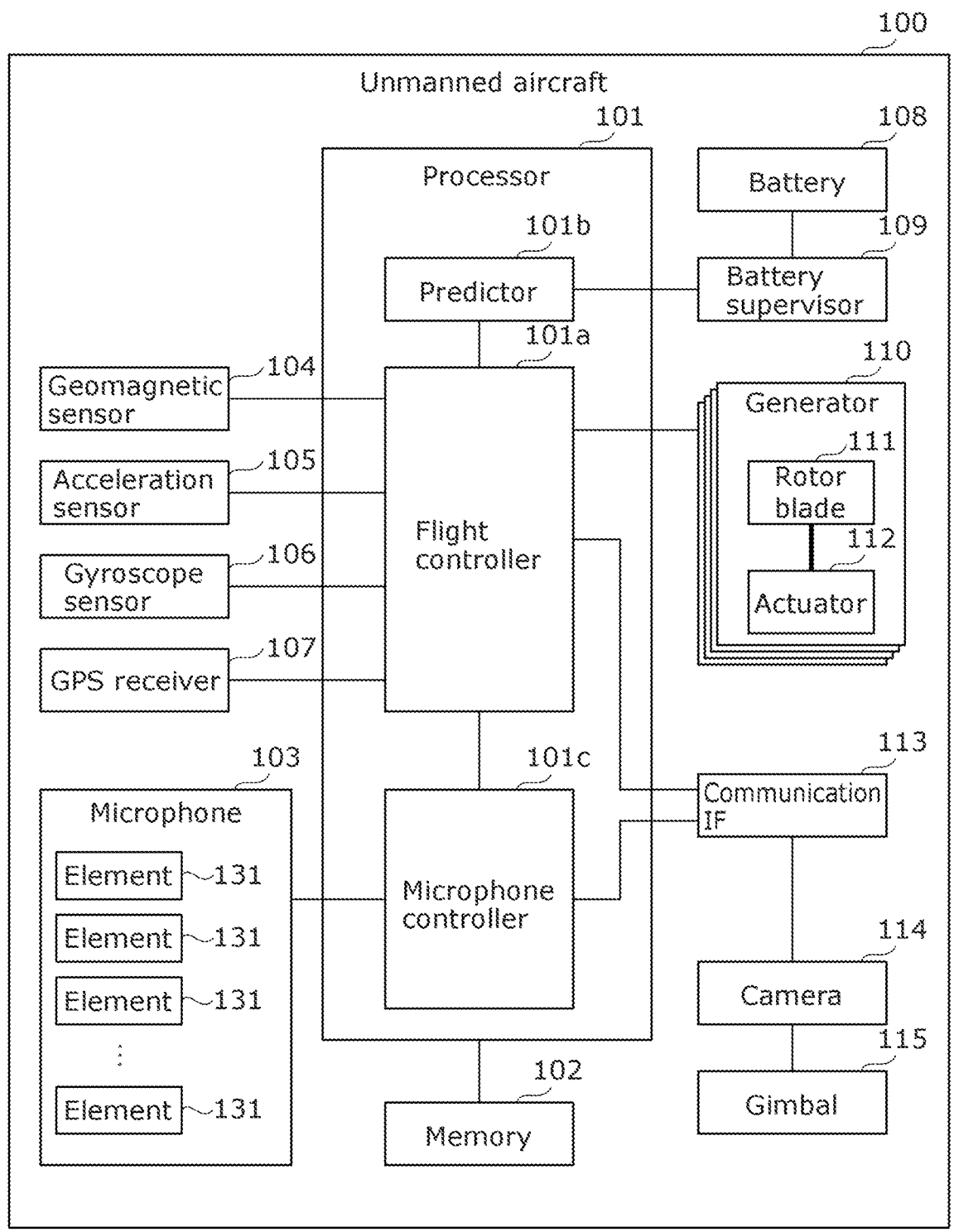
FIG. 3 is a block diagram of the configuration of the unmanned aircraft according to Embodiment 1.

FIG. 3 is a block diagram of the configuration of the unmanned aircraft according to Embodiment 1. More specifically, FIG. 3 is a block diagram for explaining the hardware configuration of unmanned aircraft 100 and the function of processor 101.

Unmanned aircraft 100 includes processor 101, memory 102, microphone 103, geomagnetic sensor 104, acceleration sensor 105, gyroscope sensor 106, global positioning system (GPS) receiver 107, battery 108, battery supervisor 109, generators 110, communication interface (IF) 113, camera 114, and gimbal 115.

Processor 101 obtains results such as: detection results from various sensors such as microphone 103, geomagnetic sensor 104, acceleration sensor 105, gyroscope sensor 106, GPS receiver 107, and an image sensor of camera 114; and a reception result from communication IF 113. Processor 101 performs various processes on the obtained detection results or reception result by executing a predetermined program stored in memory 102 or a non-illustrated storage. For example, processor 101 performs a detection process of detecting a target sound signal of the target sound from signals output from a plurality of elements 131 of microphone 103. Through this, processor 101 controls at least one of four generators 110, microphone 103, camera 114, or communication IF 113.

Memory 102 stores, for example, coefficients that are used to perform a reduction process of reducing noise in signals output from a plurality of elements 131 of microphone 103, and that are in correspondence with combinations of elements that output signals to be subjected to the noise reduction process. Memory 102 may store all signals output from a plurality of elements 131 of microphone 103. Memory 102 may store a program to be executed by processor 101. Memory 102 is implemented, for example, as a nonvolatile memory.

Microphone 103 includes a microphone array including a plurality of elements 131, each performing sound pickup. Microphone 103 has, for example, a spherical shape. A plurality of elements 131 are arranged substantially evenly at predetermined intervals on the surface of microphone 103 in a spherical shape. With this configuration, microphone 103 is capable of picking up sounds from a plurality of radially outward directions with respect to the center of microphone 103. Stated differently, microphone 103 is capable of picking up sounds from a plurality of different directions around microphone 103. Note that microphone 103 is not limited to having a spherical shape, and thus may have a disc shape. In this case, a plurality of elements 131 may be arranged at predetermined intervals on the surface of microphone 103 having a disc shape. Also note that the number of elements 131 may be, for example, 4, 8, or 16, or may be any other numbers.

Geomagnetic sensor 104 is a sensor that detects a direction in which a reference direction of unmanned aircraft 100 is oriented. The reference direction may be, for example, the forward direction of unmanned aircraft 100. Geomagnetic sensor 104 is an example of an attitude sensor that detects the attitude of unmanned aircraft 100.

Acceleration sensor 105 is a sensor that detects accelerations in three different directions of unmanned aircraft 100. Acceleration sensor 105 is an example of a position sensor that detects the position of unmanned aircraft 100. Note that the three different directions may be mutually perpendicular directions.

Gyroscope sensor 106 is a sensor that detects an angular rate of rotation about each of the three axes in the three different directions of unmanned aircraft 100. Gyroscope sensor 106 is an example of an attitude sensor that detects the attitude of unmanned aircraft 100.

GPS receiver 107 receives information indicating the position per se from satellites including a GPS satellite. Stated differently, GPS receiver 107 detects the current position of unmanned aircraft 100. Note that satellites that transmit information received by GPS receiver 107 are not limited to GPS satellites, and thus may be any global navigation satellite system (GNSS) satellites. GPS receiver 107 is an example of the position sensor that detects the position of unmanned aircraft 100.

Battery 108 supplies electronic devices included in unmanned aircraft 100 with electric power required by such electronic devices to operate. Such electronic devices include processor 101, memory 102, microphone 103, geomagnetic sensor 104, acceleration sensor 105, gyroscope sensor 106, GPS receiver 107, battery supervisor 109, generators 110, communication IF 113, camera 114, and gimbal 115. Battery 108 is, for example, a secondary battery capable of power charging and discharging. Battery 108 may be removable from main body 120. Battery 108 is not limited to a secondary battery, and thus may be a replaceable (removable) primary battery.

Battery supervisor 109 is a control circuit that supervises an operating status of battery 108. Battery supervisor 109 is a control circuit that controls, for example, the output of electric power charged in battery 108 to electronic devices included in unmanned aircraft 100 and the charging of electric power supplied from an external power source to battery 108.

Four generators 110 have been described above, and thus will not be described in detail here.

Communication IF 113 is a communication interface via which unmanned aircraft 100 communicates with controller 200 or a communication terminal. Communication IF 113 includes, for example, a communication interface for receiving a transmission signal from controller 200. Communication IF 113 may also be a wireless local area network (LAN) interface compliant with, for example, IEEE802.11a, b, g, n, ac, or ax standard, or may be an interface compliant with a Bluetooth® standard. Alternatively, communication IF 113 may be a communication interface for communication with camera 114. In this case, communication IF 113 may be, for example, a wire communication interface utilizing a universal serial bus (USB), etc.

Camera 114 is a device having an imaging sensor and an optical system such as a lens. Camera 114 is supported by gimbal 115 for maintaining a constant attitude of camera 114 in the three-axis directions. Gimbal 115 is a device for maintaining a desired attitude of camera 114 relative to, for example, the terrestrial coordinate system, even when the attitude of unmanned aircraft 100 changes. Here, the desired attitude may be an attitude that is determined by an imaging direction of camera 114 indicated by an operation signal received from controller 200. Note that the orientation of camera 114 relative to main body 120 may be fixed without supporting camera 114 by gimbal 115.

Processor 101 includes flight controller 101a, predictor 101b, and microphone controller 101c as functional components. Stated differently, the functions of flight controller 101a, predictor 101b, and microphone controller 101c are implemented by processor 101 executing the program stored in memory 102.

Flight controller 101a controls the number of rotations of actuator 112 of each generator 110 per unit time (i.e., rotational speed) in accordance with the current position, flight speed, and flight attitude of unmanned aircraft 100 detected by geomagnetic sensor 104, acceleration sensor 105, gyroscope sensor 106, GPS receiver 107, and so forth, and the operation signal from controller 200 received by communication IF 113. Through this, flight controller 101a controls the aircraft state of unmanned aircraft 100. Stated differently, flight controller 101a controls the aircraft state of unmanned aircraft 100 in accordance within an operation signal output from controller 200 in response to a user operation to controller 200.

Predictor 101b obtains, from battery supervisor 109, charging information indicating the amount of remaining battery of battery 108. On the basis of the amount of remaining battery indicated by the charging information, predictor 101b predicts future flight hours for which unmanned aircraft 100 is able to fly. Predictor 101b predicts the flight hours on the basis of, for example, the amount of remaining battery, the amount of power consumption by generators 110 of unmanned aircraft 100, and the amount of power consumption by processor 101. Predictor 101b may previously calculate the amount of power consumption by generators 110 and the amount of power consumption by processor 101 to predict flight hours using the results of such calculations.

Microphone controller 101c obtains, from each of a plurality of elements 131 of microphone 103, a signal output from each element 131 by sound detection. Microphone controller 101c obtains, from a plurality of elements 131, a plurality of signals corresponding to the respective elements 131. Microphone controller 101c also performs a detection process of detecting a target sound signal of the target sound from the obtained signals. Microphone controller 101c changes target elements that output signals to be processed among a plurality of elements 131, in accordance with the result of the detection process. In the detection process, microphone controller 101c may perform, for example, signal conversion of converting a plurality of signals from digital signals into analog signals.

Figure 4:
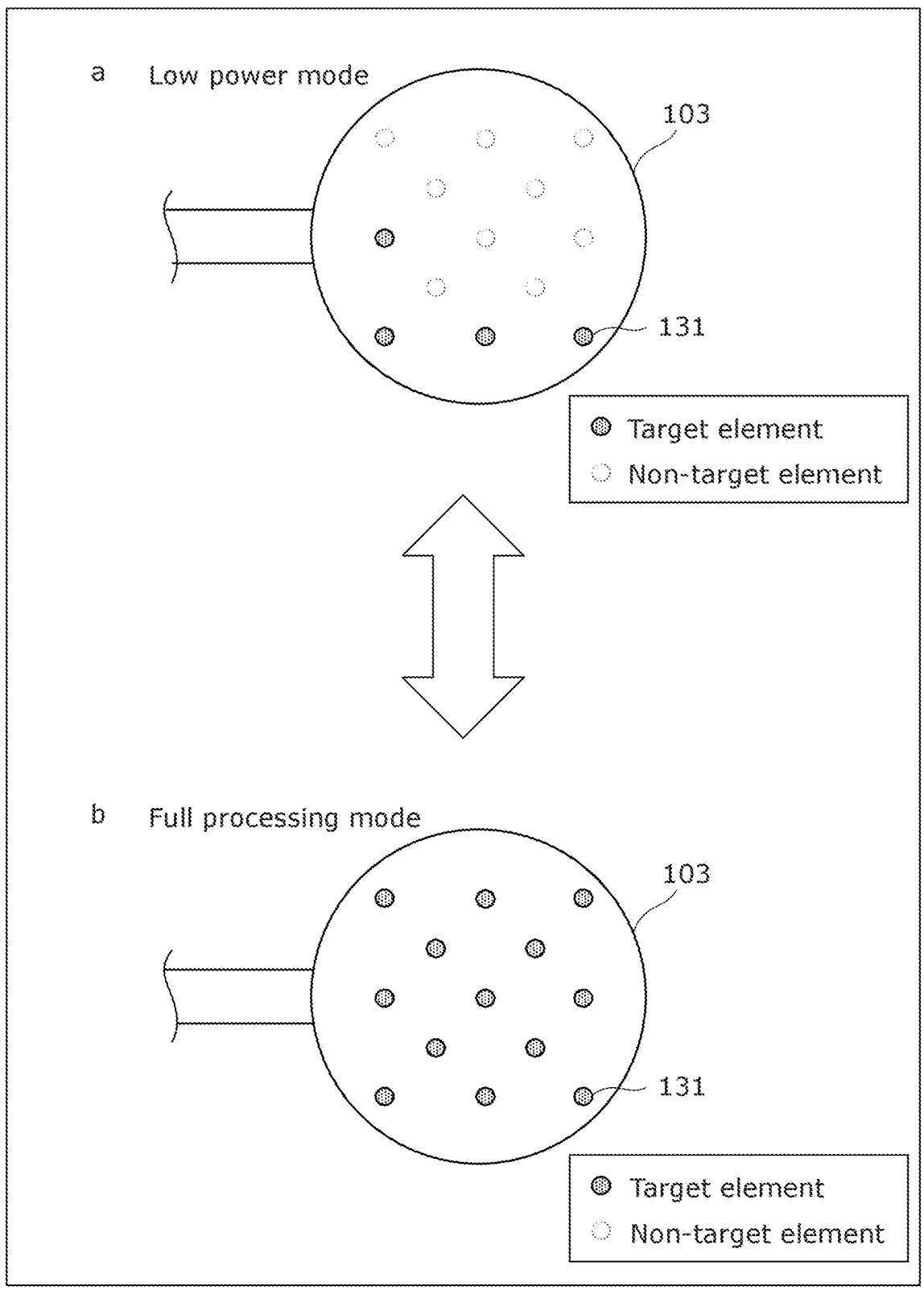
FIG. 4 is a diagram for explaining an exemplary process of changing target elements that output signals to be processed by a processor.

FIG. 4 is a diagram for explaining an exemplary process of changing target elements that output signals to be processed.

As shown in the drawing, microphone controller 101c switches between a low power mode and a full processing mode to perform a detection process. In the low power mode, microphone controller 101c performs the detection process with some of elements 131 of microphone 103 as target elements used for the detection process and the other elements not as target elements used for the detection process. In the low power mode, as described above, microphone controller 101c uses signals output from some of elements 131 of microphone 103 for the detection process, without using signals output from the other elements for the detection process. Meanwhile, in the full processing mode, microphone controller 101c uses signals output from all elements 131 of microphone 103 for the detection process.

Stated differently, the low power mode, in which signals output from the elements other than the target elements are not used for the detection process, requires a reduced processing load for the detection process than the full processing mode. The low power mode is thus capable of reducing power consumption compared to the full processing mode. Meanwhile, the full processing mode, in which signals output from all elements 131 are used for the detection process, improves the quality of the detected target sound compared to the low power mode.

Upon detection of a target sound signal by the detection process, for example, microphone controller 101c may switch from the low power mode to the full processing mode to increase the number of target elements that output signals to be processed. Microphone controller 101c may determine that the target sound signal has been detected upon detection of a sound in a predetermined frequency range by the detection process. Here, a sound in the predetermined frequency range is, for example, human voice, i.e., speech, which is in the range between 300 Hz and 11000 Hz. This configuration enables microphone controller 101c to perform the detection process in the low power mode during a period in which no target sound signal has been detected. This thus reduces power consumption during the period in which no target sound signal has been detected. This configuration also enables microphone controller 101c to switch from the low power mode to the full processing mode upon detection of the target sound signal, thus improving the quality of the target sound obtained by the detection process.

Alternatively, for example, microphone controller 101c may switch from the full processing mode to the low power mode upon detection of the target sound signal by the detection process to decrease the number of target elements that output signals to be processed. This configuration enables microphone controller 101c to perform a highly sensitive detection of the target sound, thereby reducing the time required to detect the target sound. This configuration thus reduces the power consumed by the process of detecting the target sound. The full processing mode, in which signals from all elements are used for the detection process, achieves highly accurate estimation of the position of the sound source of the target sound. This configuration thus enables the selection of elements, as the target elements, that are appropriate for the estimated position of the sound source of the target sound. This effectively improves the quality of the target sound to be obtained even in the low power mode.

Figure 5:
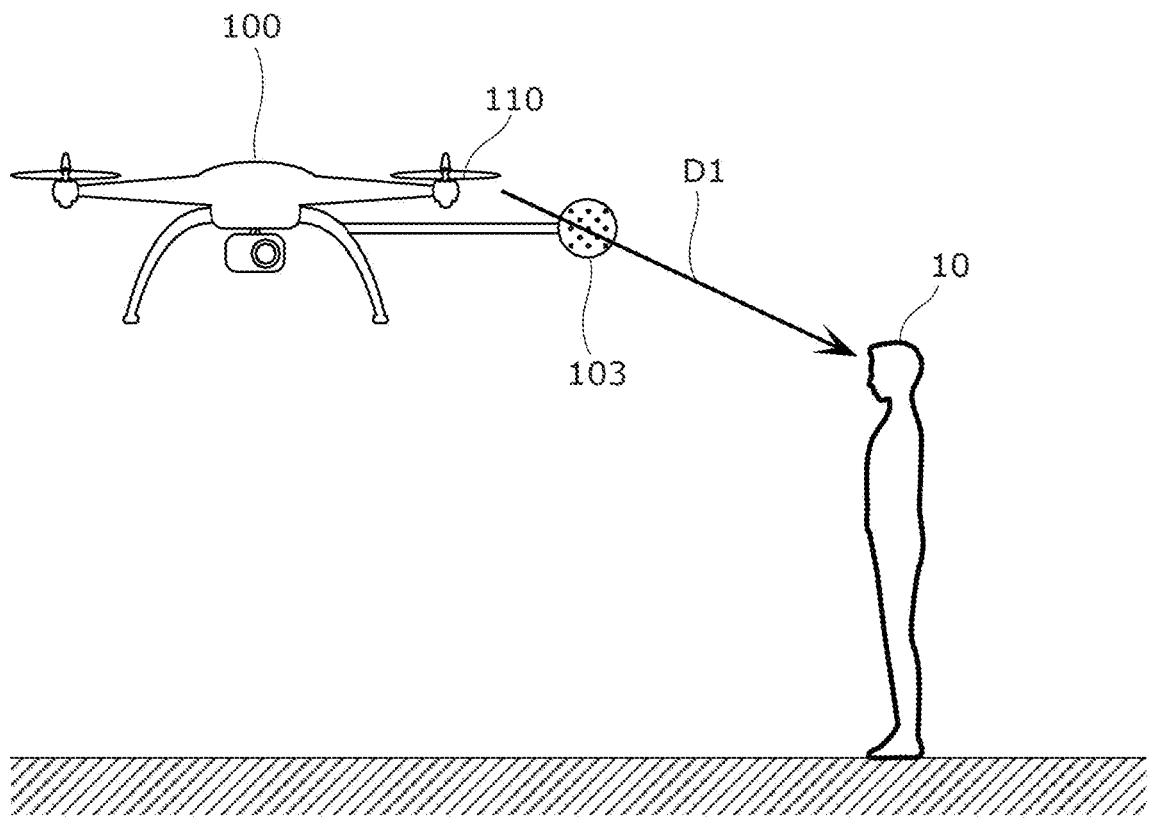
FIG. 5 is a diagram showing a positional relation between the unmanned aircraft and a sound source in a first scene viewed from a horizontal direction.
Figure 6:
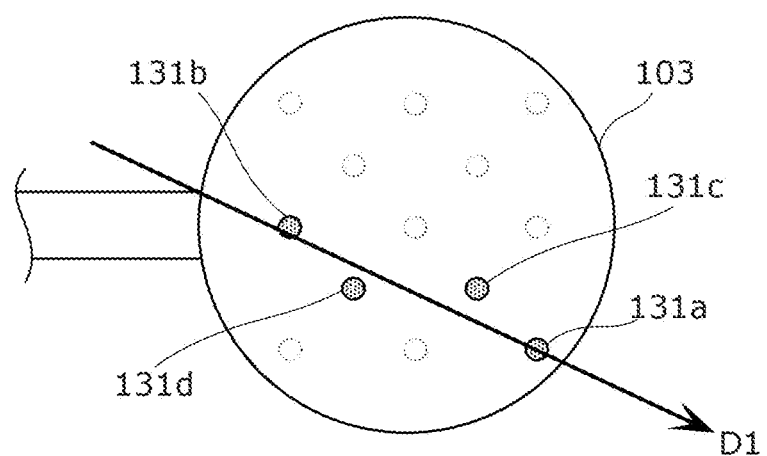
FIG. 6 is a diagram showing an example of elements selected as target elements in the first scene.

FIG. 5 and FIG. 6 are diagrams showing an example of elements to be selected as target elements in a first scene in the low power mode. FIG. 5 is a diagram showing a positional relation between the unmanned aircraft and the sound source in the first scene viewed from a horizontal direction. FIG. 6 is a diagram showing an example of elements selected as target elements in the first scene.

Microphone controller 101c selects, as a target element used for the detection process, a first element that is located in a specific direction from microphone 103. More specifically, microphone controller 101c may process signals output from a plurality of elements 131, using a direction estimation algorithm, to estimate as the specific direction a direction in which the sound pressure of the target sound is estimated to be high.

Instead of using the detection results of microphone 103, microphone controller 101c may use an image captured by the imaging sensor of camera 114 to estimate the specific direction. In this case, microphone controller 101c identifies the position of the sound source in the captured image by recognizing, through an image process performed on the image, the color, shape, type, and so forth of the sound source that are preliminary defined. Microphone controller 101c then estimates a direction of the sound source with respect to unmanned aircraft 100 as the specific direction, using the position and attitude of camera 114 with respect to unmanned aircraft 100 at the time of capturing the foregoing image and the position of the sound source inside of the image.

Alternatively, microphone controller 101c may identify the specific direction on the basis of an operation signal received by communication IF 113 from controller 200. In this case, the operation signal includes information indicating the specific direction.

Note that examples of the sound source include a person, an animal, a speaker, and a vehicle.

As shown in FIG. 5, the first scene is a scene in which unmanned aircraft 100 is located above the head of the person serving as sound source 10. In the first scene, microphone controller 101c selects, as the first element, element 131a in a position at the side of direction D1, among the positions on the surface of microphone 103. Direction D1 is an obliquely outward and downward direction from unmanned aircraft 100 in which sound source 10 is predicted to be located.

Microphone controller 101c also selects, as a target element used for the detection process, a second element that is closer than element 131a to the source of noise generated by unmanned aircraft 100. For example, microphone controller 101c selects, as the second element, element 131b that is closer to at least one generator 110, which is a source of noise generated by unmanned aircraft 100. Microphone controller 101c may further select, as third elements, elements 131c and 131d that are located between element 131a and element 131b.

In the first scene, microphone controller 101c performs the detection process on a signal output from element 131a in a position corresponding to specific direction D1 on microphone 103. This improves the recording quality of sound from specific direction D1. In the first scene, elements 131a, 131b, 131c, and 131d, among elements 131 of microphone 103, are located at different distances from at least one generator 110 that is a source of noise generated by unmanned aircraft 100. As such, time differences are likely to occur among elements 131a, 131b, 131c, and 131d in picking up of the noise generated by such generator 110. This effectively reduces noise generated by unmanned aircraft 100 in the detection process, thereby preventing the recording quality of the target sound from being degraded by noise generated by unmanned aircraft 100. This configuration is thus capable of improving the recording quality of the target sound.

Figure 7:
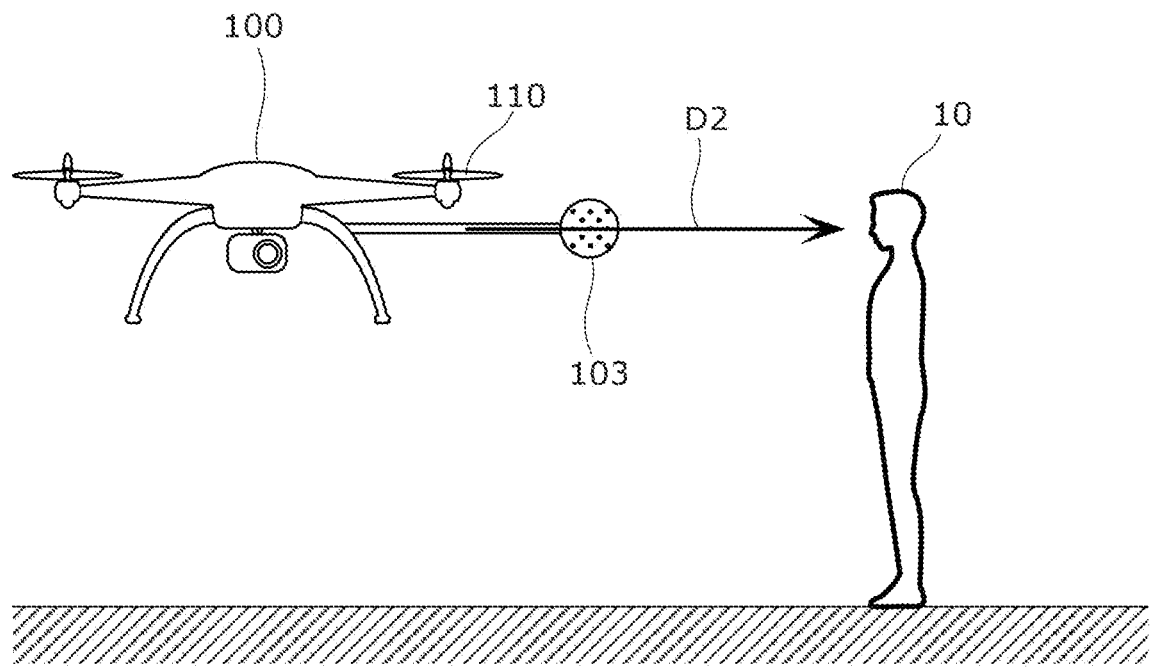
FIG. 7 is a diagram showing a positional relation between the unmanned aircraft and the sound source in a second scene viewed from a horizontal direction.
Figure 8:
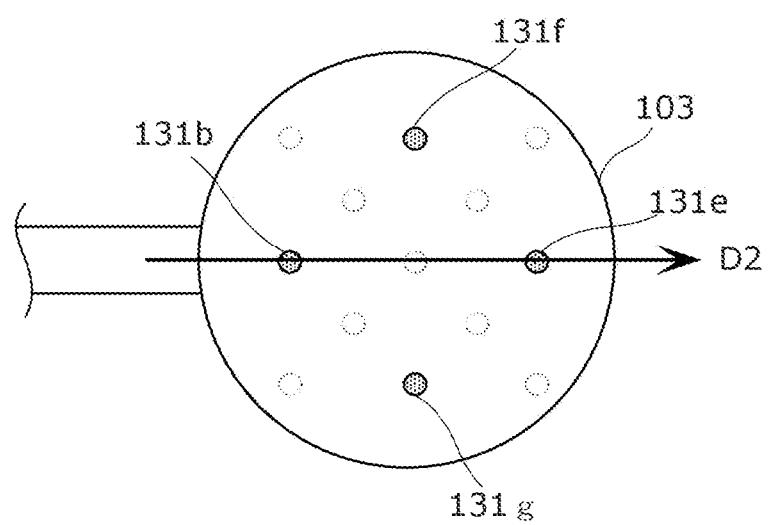
FIG. 8 is a diagram showing an example of elements selected as target elements in the second scene.

FIG. 7 and FIG. 8 are diagrams showing an example of elements to be selected as target elements in a second scene in the low power mode. FIG. 7 is a diagram showing a positional relation between the unmanned aircraft and the sound source in the second scene viewed from a horizontal direction. FIG. 8 is a diagram showing an example of elements selected as target elements in the second scene.

As shown in FIG. 7, the second scene is a scene in which unmanned aircraft 100 is located at an equal level as that of sound source 10. In the second scene, microphone controller 101c selects, as the first element, element 131e in a position at the side of direction D2, among the positions on the surface of microphone 103. Direction D2 is a horizontally outward direction from unmanned aircraft 100 in which sound source 10 is predicted to be located.

Microphone controller 101c also selects, as a target element used for the detection process, a second element that is closer than element 131e to the source of the noise generated by unmanned aircraft 100. For example, microphone controller 101c selects, as the second element, element 131b that is close to at least one generator 110, which is a source of noise generated by unmanned aircraft 100. Microphone controller 101c may further select, as third elements, elements 131f and 131g that are located between element 131e and element 131b.

In the second scene, microphone controller 101c performs the detection process on a signal output from element 131e in a position corresponding to specific direction D2 from microphone 103. This improves the recording quality of a sound from specific direction D2. In the second scene, elements, 131b, 131e, 131f, and 131g, among elements 131 of microphone 103, are located at different distances from at least one generator 110, which is a source of noise generated by unmanned aircraft 100. As such, time differences are likely to occur among elements 131b, 131e, 131f, and 131g in picking up of the noise generated by such generator 110. This effectively reduces noise generated by unmanned aircraft 100 in the detection process, thereby preventing the recording quality of the target sound from being degraded by noise generated by unmanned aircraft 100. This configuration is thus capable of improving the recording quality of the target sound.

Figure 9:
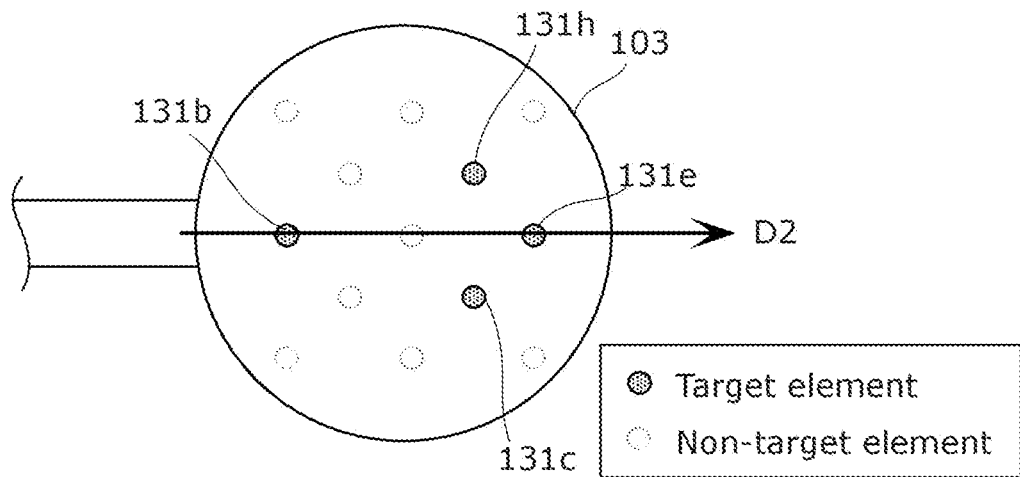
FIG. 9 is a diagram showing another example of elements selected as target elements in the second scene.
Figure 10:
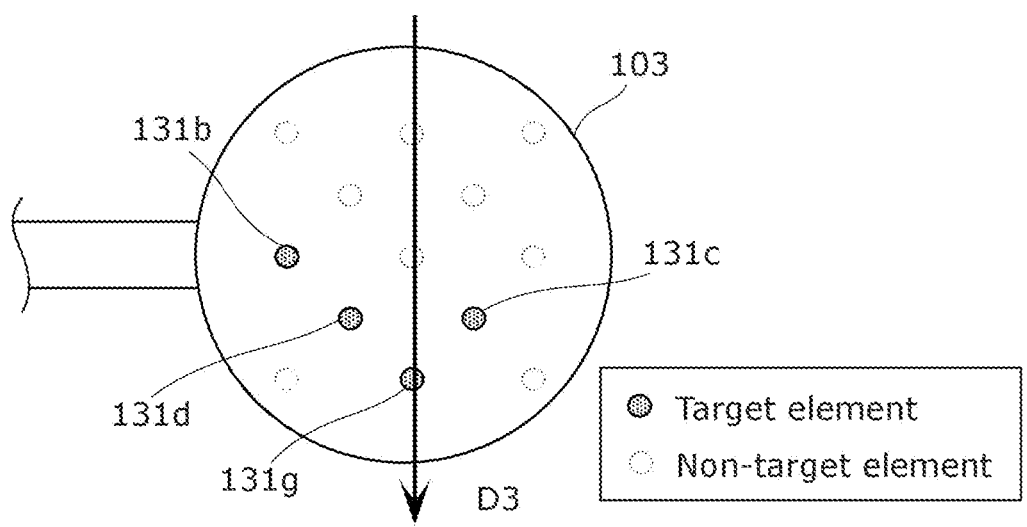
FIG. 10 is a diagram showing an example of elements selected as target elements in a third scene.
Figure 11:
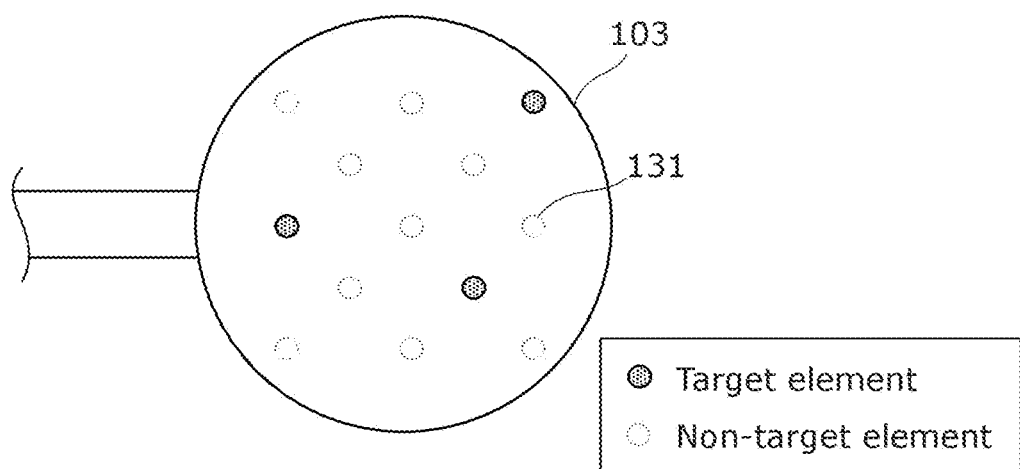
FIG. 11 is a diagram showing an example of elements selected as target elements used for the detection of a target sound in a low power mode.

Note that elements selected in the low power mode are not limited to the examples shown in FIG. 5 through FIG. 8, and thus elements as shown in FIG. 9 through FIG. 11 may be selected.

FIG. 9 is a diagram showing another example of elements selected as target elements in the second scene. Unlike the case of FIG. 8, microphone controller 101c in this case may select elements 131c and 131h located close to the straight line that extends in direction D2 and that passes through element 131e, among the elements excluding element 131e as the first element and element 131b as the second element.

FIG. 10 is a diagram showing an example of elements selected as target elements in a third scene. The third scene is a scene in which microphone 103 of unmanned aircraft 100 is located immediately above sound source 10. In this case, microphone controller 101c selects, as the first element, element 131g in a position at the side of direction D3 in which sound source 10 is predicted to be located, among the positions on the surface of microphone 103.

Microphone controller 101c also selects, as the second element, element 131b that is closer than element 131g to the source of the noise generated by unmanned aircraft 100. Microphone controller 101c may further select elements 131c and 131d located close to the straight line that extends in direction D3 and that passes through element 131g, among the elements excluding element 131g as the first element and element 131b as the second element.

FIG. 11 is a diagram showing an example of elements selected as target elements used for the detection of a target sound in the low power mode. As shown in FIG. 11, microphone controller 101c may select, as the target elements, elements located in different directions in the low power mode for the case of switching to the full processing mode upon detecting a target sound signal by the detection process. More specifically, microphone controller 101c may select dispersedly located elements so that non-target elements are present between target elements, i.e., no adjacent elements are selected as target elements. This enables an effective detection of a target sound even in the case where a small number of elements are selected as target elements.

Operation

The following describes an operation performed by unmanned aircraft 100.

Figure 12:
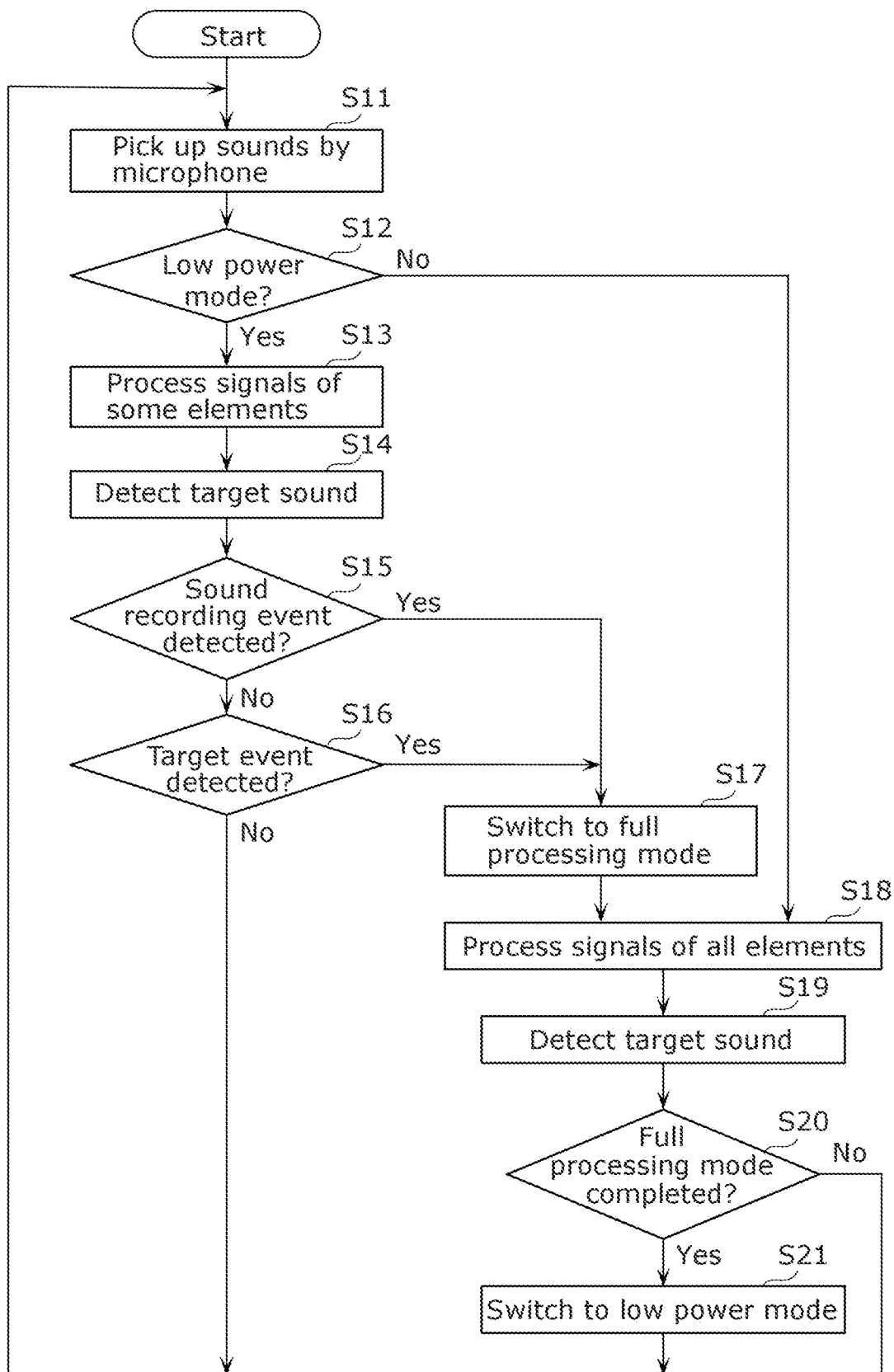
FIG. 12 is a flowchart of an exemplary sound recording operation performed by the unmanned aircraft.

FIG. 12 is a flowchart of an exemplary sound recording operation performed by unmanned aircraft 100.

In unmanned aircraft 100, microphone 103 picks up sounds (S11).

Then, processor 101 determines whether the current sound recording processing mode is the low power mode (S12). More specifically, processor 101 refers to mode information that is stored in memory 102 and indicates the current sound recording processing mode to determine whether the sound recording processing mode stored in memory 102 is the low power mode.

When determining that the current sound recording processing mode is the low power mode (Yes in S12), processor 101 performs a predetermined process using signals output from some of elements selected in the low power mode, among all elements 131 of microphone 103 (S13). The predetermined process performed by processor 101 is, for example, a process of reducing the noise generated by at least one generator 110 of unmanned aircraft 100 from a plurality of signals output from the elements selected as the target elements used for the detection process. Note that the number of elements selected as the target elements used for the detection process in the low power mode is not limited to a plurality of signals, and thus a single element may be selected.

Processor 101 then detects the target sound, using the result of the predetermined process performed in step S13 (S14). For example, processor 101 detects a target sound signal representing the target sound in a predetermined frequency range from the signals that have undergone the noise reduction process.

Processor 101 then determines whether a sound recording event has been detected (S15). For example, processor 101 may determine that a sound recording event has been detected in the case where the sound pressure level of the target sound signal detected in step S14 is higher than or equal to a predetermined sound pressure level. Alternatively, processor 101 may determine that a sound recording event has been detected in the case where, for example, the sound pressure level of the target sound signal detected in step S14 in the specified frequency range is higher than or equal to a predetermined sound pressure level. Processor 101 may also determine that a sound recording event has been detected in the case where, for example, a predetermined command is included in the result of sound recognition performed on the target sound signal.

When determining that no sound recording event has been detected (No in S15), processor 101 determines whether a target event has been detected (S16). For example, processor 101 may determine that a target event has been detected in the case where GPS receiver 107 of unmanned aircraft 100 has detected that unmanned aircraft 100 is located inside of a predetermined region. Processor 101 may also determine that a target event has been detected in the case where, for example, an operation signal received by communication IF 113 from controller 200 includes information indicating the start of a target event. Alternatively, processor 101 may determine that a target event has been detected in the case where, for example, a person has been detected in an image captured by camera 114 as a result of performing image processing on such image.

When determining that a sound recording event has been detected (Yes in S15), or a target event has been detected (Yes in S16), processor 101 switches the sound recording processing mode to the full processing mode (S17). After switching to the full processing mode, for example, processor 101 updates the mode information stored in memory 102 into information indicating that the current sound recording processing mode is the full processing mode.

Note that the determination in step S15 and the determination in step S16 are separately performed in the above description, but these determinations may be performed as a single determination. When these determinations are performed as a single determination, processor 101 determines, for example, whether an event has been detected. Event detection here includes the detection of a sound recording event and the detection of a target event.

Processor 101 then performs a predetermined process using signals output from all elements 131 of microphone 103 (S18). Here, the predetermined process performed by processor 101 is, for example, a process of reducing the noise generated by at least one generator 110 of unmanned aircraft 100, using a plurality of signals output from all elements 131. Note that step S18 is also performed in the case whether processor 101 determines in step S12 that the current sound recording processing mode is the full processing mode (No in S12).

Processor 101 then detects the target sound, using the result of the predetermined process performed in step S18 (S19). For example, processor 101 detects a target sound signal representing the target sound in a predetermined frequency range from the signals that have undergone the noise reduction process.

Processor 101 then determines whether the full processing mode has been completed (S20). For example, processor 101 may determine that the full processing mode has been completed in the case where the operation signal received by communication IF 113 from controller 200 indicates the completion of the full processing mode. Processor 101 may also determine that the full processing mode has been completed in the case where, for example, a predetermined time has elapsed after the target sound is detected last. Alternatively, processor 101 may determine that the full processing mode has been completed in the case where, for example, GPS receiver 107 has detected that unmanned aircraft 100 is located outside of a predetermined region.

When determining that the full processing mode has been completed (Yes in S20), processor 101 switches the sound recording processing mode to the low power mode (S21). When switching to the low power mode, for example, processor 101 updates the mode information stored in memory 102 into information indicating that the current sound recording processing mode is the low power mode.

Processor 101 returns to step S11 to perform step S11, in the case where: processor 101 determines that no target event has been detected in step S16 (No in S16); processor 101 determines that the full processing mode has not been completed in step S20 (No in S20); or the mode switching to the low power mode has been completed in step 21.

Note that processor 101 may stop the sound recording operation by unmanned aircraft 100 in the case where the operation signal received by communication IF 113 from controller 200 indicates the stop of the operation.

Effects, Etc.

In unmanned aircraft 100 according to the present embodiment, processor 101 performs a detection process of detecting a target sound signal of the target sound from signals output from a plurality of elements 131 of microphone 103, and changes target elements that output signals to be processed by processor 101 to select at least one target element that outputs a signal to be processed from among a plurality of elements 131, in accordance with a result of the detection process. Stated differently, since processor 101 changes the target elements that output signals to be processed in accordance with the result of detecting the target sound signal, processor 101 does not perform the detection process using signals output from some of the elements at least before or after changing the target elements. This reduces processing load required for the detection process at least before or after changing of the target elements, thereby reducing the amount of power required for the detection process.

Embodiment 2

The following describes Embodiment 2.

Processor 101 of unmanned aircraft 100 according to Embodiment 1 changes target elements that output signals to be processed among a plurality of elements 131 of microphone 103, in accordance with the result of a detection process, but the present disclosure is not limited to this configuration. Processor 101 of unmanned aircraft 100 according to Embodiment 2 obtains the amount of remaining battery of battery 108 included in unmanned aircraft 100, and changes target elements that output signals to be processed among a plurality of elements 131 of microphone 103, in accordance with the amount of remaining battery.

In this case, communication IF 113 of unmanned aircraft 100 obtains, for example, a flight route of unmanned aircraft 100 from controller 200 or another device. Flight controller 101a estimates the amount of remaining battery at each point on the flight route at which unmanned aircraft 100 is scheduled to arrive, on the basis of the flight route obtained by communication IF 113 and the amount of remaining battery obtained by predictor 101b.

Figure 13:
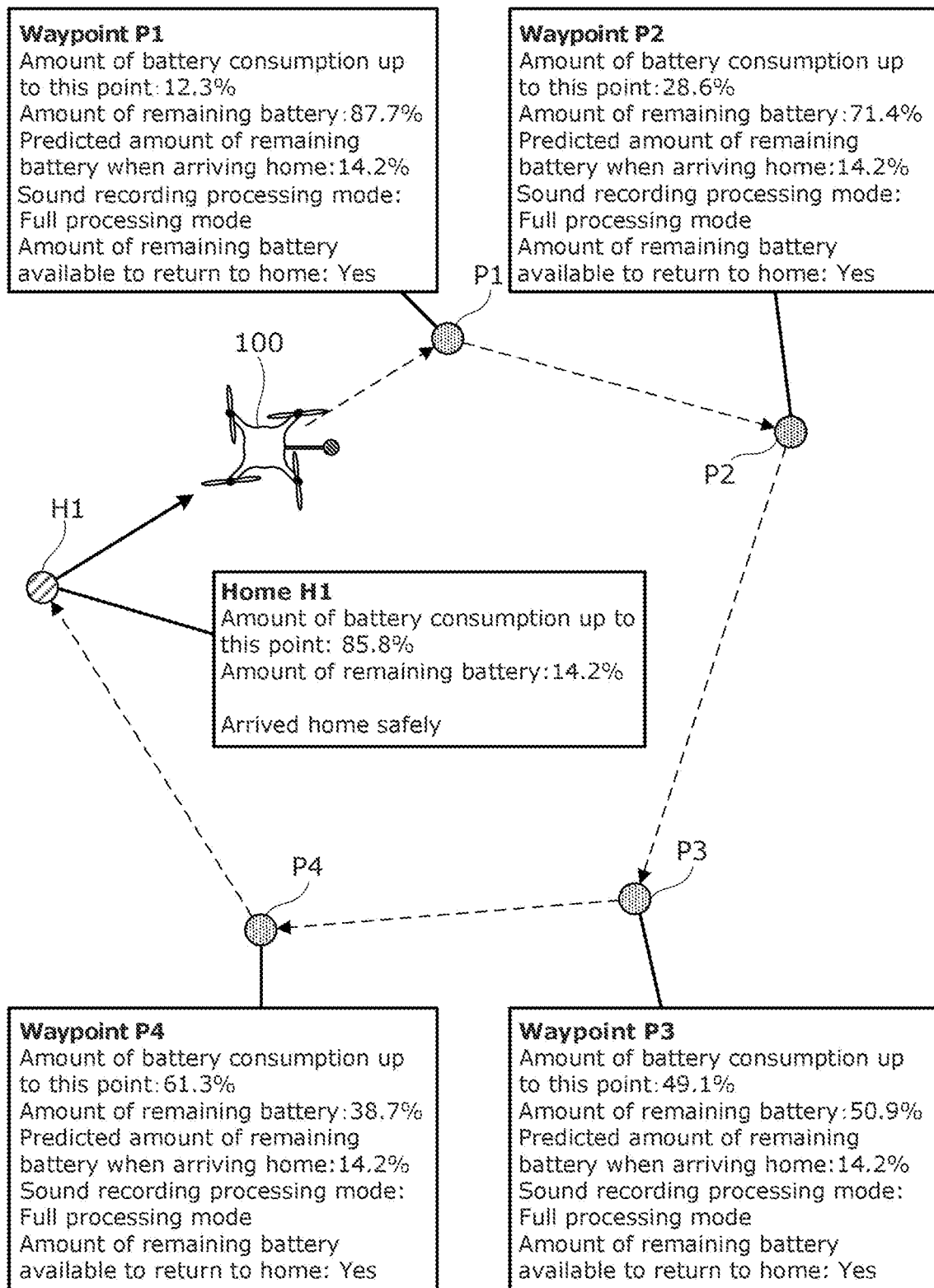
FIG. 13 is a diagram for explaining a first exemplary process of changing target elements in accordance with the amount of remaining battery.
Figure 14:
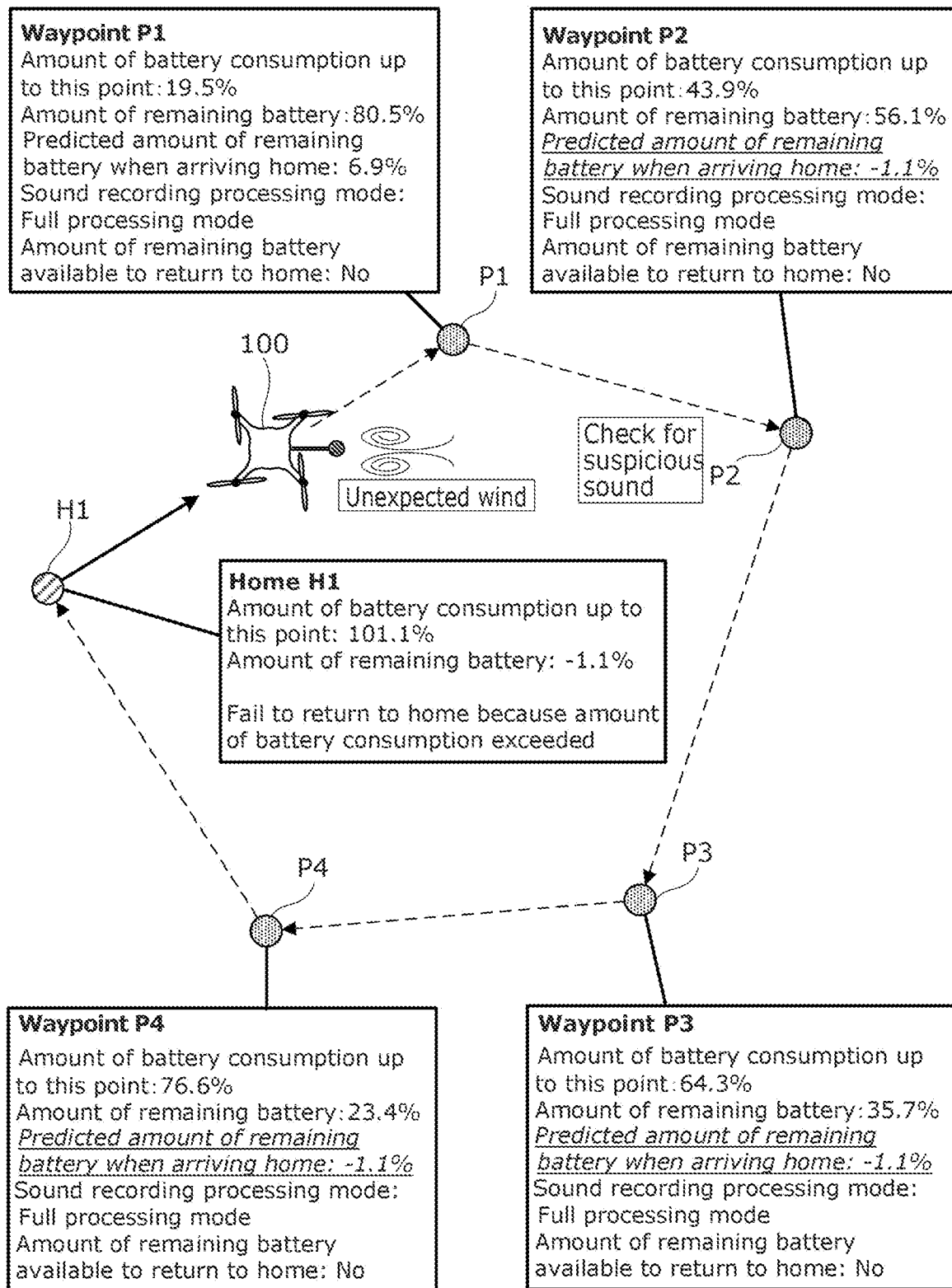
FIG. 14 is a diagram for explaining a second exemplary process of changing target elements in accordance with the amount of remaining battery.
Figure 15:
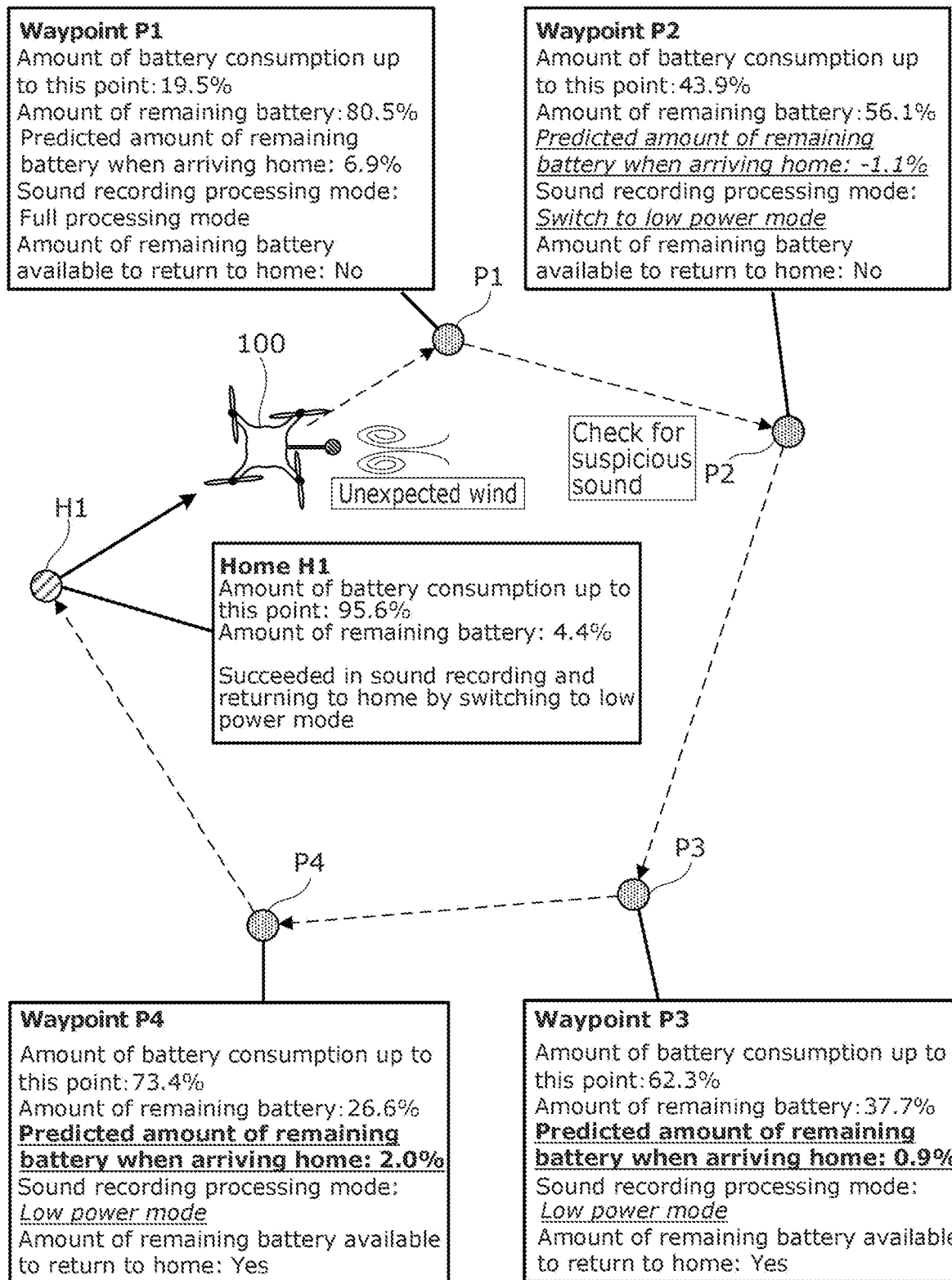
FIG. 15 is a diagram for explaining a third exemplary process of changing target elements in accordance with the amount of remaining battery.

With reference to FIG. 13 through FIG. 15, the following describes a process of changing target elements that output signals to be processed among a plurality of elements 131 of microphone 103, in accordance with the amount of remaining battery.

FIG. 13 is a diagram for explaining a first exemplary process of changing target elements in accordance with the amount of remaining battery. FIG. 14 is a diagram for explaining a second exemplary process of changing target elements in accordance with the amount of remaining battery. FIG. 15 is a diagram for explaining a third exemplary process of changing target elements in accordance with the amount of remaining battery.

As shown in FIG. 13 through FIG. 15, an exemplary flight route of unmanned aircraft 100 is a flight route on which unmanned aircraft 100 starts from the position of home H1, passes through waypoints P1, P2, P3, and P4 in stated order, and returns to home H1.

As shown in FIG. 13, the first example is an example in which unmanned aircraft 100 performs sound recording in the full processing mode throughout the flight route. Predictor 101b of unmanned aircraft 100 predicts in each of waypoints P1 through P4 on the flight route: the amount of battery consumption; the amount of remaining battery; a predicted amount of remaining battery when unmanned aircraft 100 arrives home H1; the sound recording processing mode; and the amount of remaining battery available to return to home H1.

The amount of battery consumption indicates the amount of power to be consumed from home H1 to each of waypoints P1 through P4. The amount of battery consumption is, for example, the ratio of the amount of power to be consumed from home H1 to each of waypoints P1 through P4 to the battery capacity. The amount of battery consumption is determined, for example, by integrating time-series variations in the output current during the period in which unmanned aircraft 100 is operating, and then by multiplying the resulting value of the time integral by the rated voltage of battery 108. The time series variations in the output current are obtained by sequentially measuring the output current from battery 108.

The amount of remaining battery indicates the amount of remaining battery of battery 108 available from home H1 to each of waypoints P1 through P4. The amount of remaining battery is, for example, the value obtained by subtracting the amount of battery consumption from 100%.

A predicted amount of remaining battery when unmanned aircraft 100 arrives home H1 is the amount of remaining battery that is predicted to remain when unmanned aircraft 100 arrives home H1 after performing sound recording mid-flight from each of waypoints P1 through P4. A predicted amount of remaining battery is the value obtained by subtracting, from the amount of remaining battery in each of waypoints P1 through P4, the ratio of the amount of power predicted to be consumed to arrive home H1 to the battery capacity. The amount of power predicted to be consumed is obtained, for example, by (i) obtaining variations in the aircraft state from each of waypoints P1 through P4 to home H1 and data on the past flight including the flight distance, the amount of power consumption corresponding to the variations in the aircraft state and the flight distance, and then (ii) calculating an average amount of power consumption from the obtained data on the past flight. Note that the variations in the aircraft state are, for example, variations in the flight speed, straight-line flight, circular flight, and so forth, or variations in the rotational speed of rotor blade 111 in each generator 110.

The sound recording processing modes are the same as those described in Embodiment 1.

The amount of remaining battery available to return to home H1 is information indicating the prediction of whether an available amount of battery remains when unmanned aircraft 100 arrives home H1. The amount of remaining battery available to return to home H1 is represented as "Yes" in the case where a predicted amount of remaining battery indicates a positive value and "No" in the case where a predicted amount of remaining battery indicates a negative value.

In the first example, the amount of remaining battery is represented as "Yes" in each of all waypoints P1 through P4, and thus unmanned aircraft 100 is able fly throughout the flight route, performing sound recording in the full processing mode, without having to switch to the low power mode.

As shown in FIG. 14, the second example is an example in which unmanned aircraft 100 flies through the same flight route as that of the first example, performing sound recording. The second example, however, is an example case where a larger amount of power of battery 108 has been consumed than in the first example because of the influence of an unexpected wind or an extra flight to check the sound source of a suspicious sound detected in the middle of the flight. The second example is an example of performing sound recording in the full processing mode throughout the flight route, as with the first example.

In the second example, unmanned aircraft 100 consumes a larger amount of power of battery 108 than in the first example before passing through waypoint P2. As such, a predicted amount of remaining battery at home H1 when unmanned aircraft 100 is in waypoint P2 indicates a negative value. Stated differently, the amount of battery to be consumed to arrive home H1 is larger than the amount of remaining battery, meaning that unmanned aircraft 100 will not be able to arrive home H1 if remaining in the full processing mode.

One possible way to increase the flight hours of unmanned aircraft 100 is to switch the sound recording processing mode from the full processing mode to the low power mode.

As shown in FIG. 15, the third example is an example in which unmanned aircraft 100 consumes a larger amount of power of battery 108 than in the first example because of the influence of an unexpected wind or an extra flight to check the sound source of a suspicious sound detected in the middle of the flight as with the second example. Different from the first example and the second example, the third example is an example of switching from the full processing mode to the low power mode to perform sound recording.

In the third example, as with the second example, unmanned aircraft 100 consumes a larger amount of power of battery 108 than in the first example before passing through waypoint P2. As such, a predicted amount of remaining battery at home H1 when unmanned aircraft 100 is in waypoint P2 indicates a negative value, meaning that unmanned aircraft 100 is predicated not to be able to arrive home H1 if remaining in the full processing mode. To address this concern, unmanned aircraft 100 switches the sound recording processing mode from the full processing mode to the low power mode. As a result, a predicted amount of remaining battery at home H1 will be a positive value when unmanned aircraft 100 is in waypoint P3 and thereafter. Unmanned aircraft 100 is thus predicted to be able to return to home H1, performing sound recording.

Figure 16:
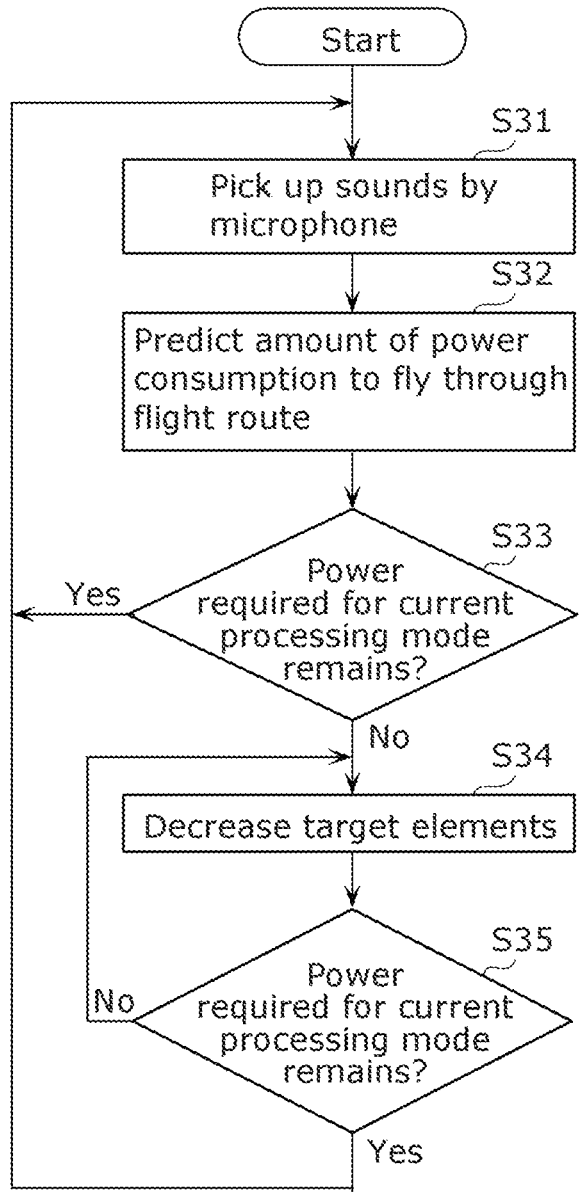
FIG. 16 is a flowchart of a first exemplary sound recording operation performed by an unmanned aircraft according to Embodiment 2.

FIG. 16 is a flowchart of a first exemplary sound recording operation performed by unmanned aircraft 100 according to Embodiment 2.

In unmanned aircraft 100, microphone 103 picks up sounds (S31).

Processor 101 then predicts the amount of power to be consumed to fly through the flight route (S32). For example, processor 101 calculates the amount of power to be consumed to perform sound recording on the return to home H1 by multiplying the flight hours required to return to home H1 from the current position via each of waypoints P1 through P4 on the flight route by the average amount of power consumption per unit time in the current sound recording processing mode. Processor 101 also calculates, for example, the amount of power to be consumed to return to home H1 from the current position via each of waypoints P1 through P4 on the flight route. Processor 101 calculates a predicted amount of power to be consumed to complete the flight through the flight routed by adding the amount of power to be consumed to perform sound recording on the return to home H1 and the amount of power to be consumed to return to home H1. Processor 101 calculates the amount of battery to be consumed to return to home H1, using the calculated amount of power consumption.

Processor 101 then determines whether power to be consumed in the current processing mode remains in battery 108 (S33). For example, processor 101 determines whether the amount of power to be consumed to fly through the flight route calculated in step S32 is smaller than the amount of remaining battery of battery 108. When the amount of battery to be consumed is smaller than the amount of remaining battery, processor 101 determines that power to be consumed in the current processing mode remains in battery 108 and otherwise determines that power to be consumed in the current processing mode does not remain in battery 108.

When determining that power to be consumed in the current processing mode does not remain in battery 108 (No in S33), processor 101 decreases the number of target elements used for sound recording, among a plurality of elements 131 of microphone 103, to perform sound recording (S34). For example, processor 101 decreases the number of target elements by switching from the full processing mode to the low power mode.

Processor 101 then determines again whether power to be consumed in the current processing mode remains in battery 108 as a result of decreasing the number of target elements used for sound recording (S35).

When determining that power to be consumed in the current processing mode does not remain in battery 108 (No in S35), processor 101 returns to step S34 to further decrease the number of target elements used for sound recording among a plurality of elements 131 of microphone 103.

When determining in step S33 or step S35 that power to be consumed in the current processing mode remains in battery 108 (Yes in S33 or S35), processor 101 returns to step S31.

Figure 17:
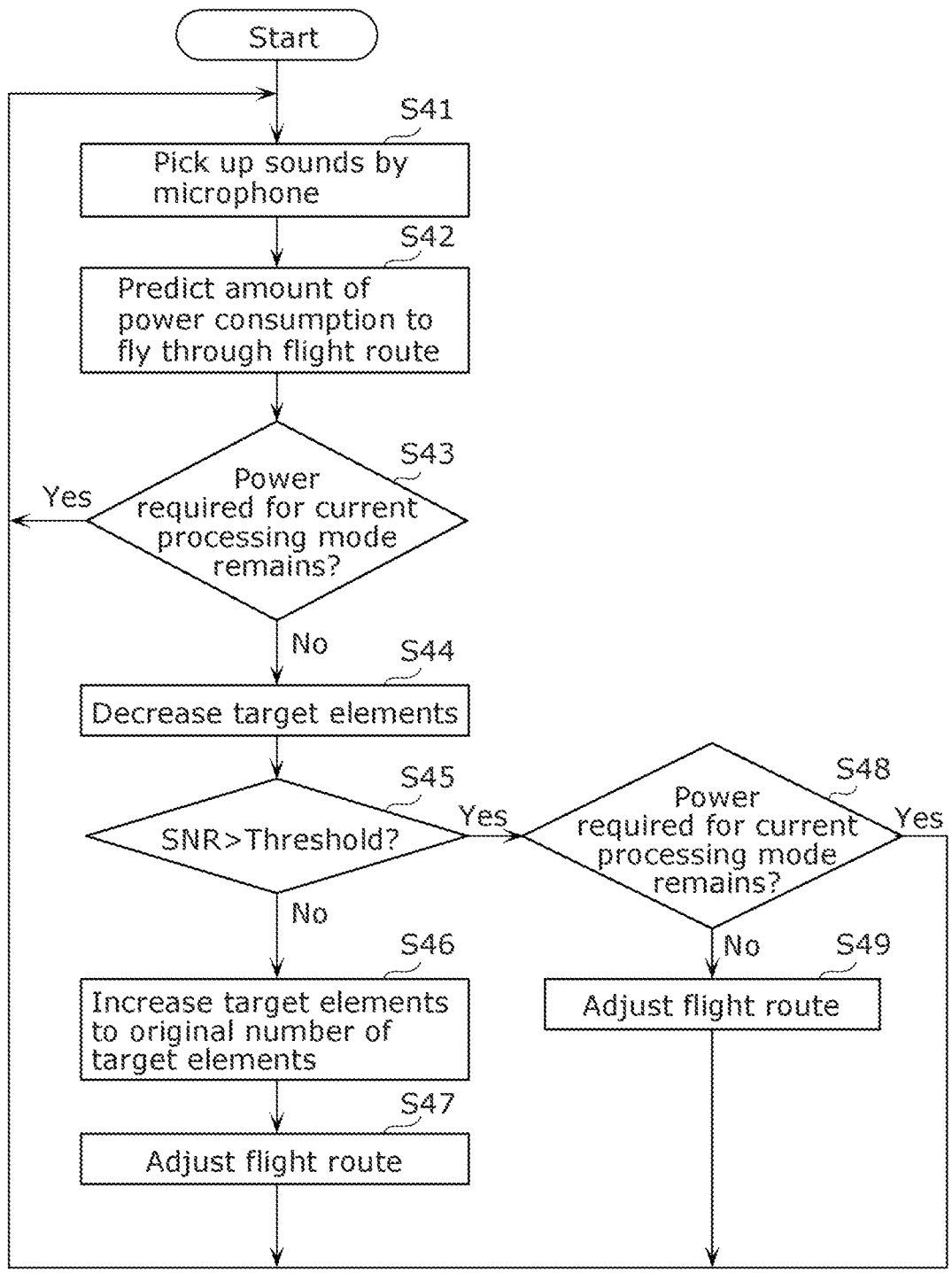
FIG. 17 is a flowchart of a second exemplary sound recording operation performed by the unmanned aircraft according to Embodiment 2.

Alternatively, unmanned aircraft 100 according to Embodiment 2 may perform a sound recording operation as shown in FIG. 17.

FIG. 17 is a flowchart of a second exemplary sound recording operation performed by unmanned aircraft 100 according to Embodiment 2.

In unmanned aircraft 100, microphone 103 picks up sounds (S41).

Processor 101 then predicts the amount of power to be consumed to fly through the flight route (S42). More specifically, processor 101 performs the same process as that of step S32.

Processor 101 then determines whether power to be consumed in the current processing mode remains in battery 108 (S43). More specifically, processor 101 performs the same process as that of step S33.

When determining that power to be consumed in the current processing mode does not remain in battery 108 (No in S43), processor 101 decreases the number of target elements used for sound recording, among a plurality of elements 131 of microphone 103, to perform sound recording (S44). For example, processor 101 decreases the number of target elements by switching from the full processing mode to the low power mode.

Processor 101 then estimates the signal-noise ratio (SNR) of the target sound obtained by sound recording to determine whether the estimated SNR is greater than the threshold (S45). Note that the SNR of the target sound is an exemplary indicator of the quality of the target sound. The SNR of the target sound is, for example, the difference between the sound pressure level of a signal obtained by microphone 103 by picking up a sound generated by unmanned aircraft 100 in flight before the noise reduction process and the sound pressure level of a target sound picked up by microphone 103 after the noise reduction process.

When determining that the SNR of the target sound obtained by sound recording is lower than or equal to the threshold (No in S45), processor 101 increases the number of target elements decreased in step S44 to the original number to perform sound recording (S46).

Processor 101 then adjusts the flight route of unmanned aircraft 100 (S47). For example, processor 101 reduces the distance of the flight route.

When determining that the SNR of the target sound obtained by sound recording is greater than the threshold (Yes in S45), processor 101 determines whether the amount of power to be consumed in the current processing mode remains in battery 108 (S48). More specifically, processor 101 performs the same process as that of step S43.

When determining that the amount of power to be consumed in the current processing mode does not remain in battery 108 (No in S48), processor 101 adjusts the flight route of unmanned aircraft 100 (S49). For example, processor 101 reduces the distance of the flight route.

When determining in step S43 or S48 that the amount of power to be consumed in the current processing mode remains in battery 108 (Yes in S43 or S48), processor 101 returns to step 41 after performing step S47 or step S49.

Figure 18:
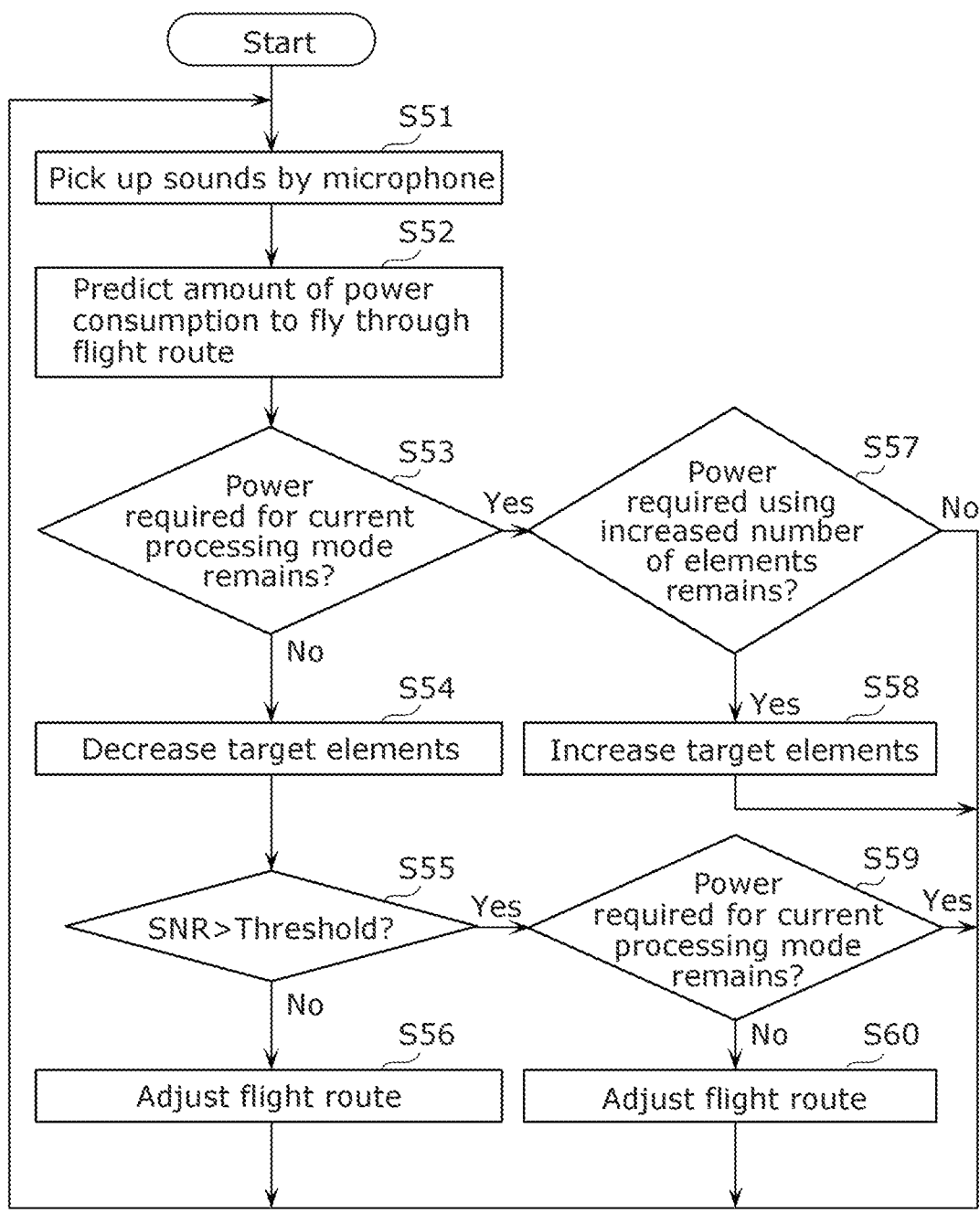
FIG. 18 is a flowchart of a third exemplary sound recording operation performed by the unmanned aircraft according to Embodiment 2.

Alternatively, unmanned aircraft 100 according to Embodiment 2 may perform a sound recording operation as shown in FIG. 18.

FIG. 18 is a flowchart of a third exemplary sound recording operation performed by unmanned aircraft 100 according to Embodiment 2.

In unmanned aircraft 100, microphone 103 picks up sounds (S51).

Processor 101 then predicts the amount of power to be consumed to fly through the flight route (S52). More specifically, processor 101 performs the same process as that of step S32.

Processor 101 then determines whether power to be consumed in the current processing mode remains in battery 108 (S53). More specifically, processor 101 performs the same process as that of step S33.

When determining that power to be consumed in the current processing mode does not remain in battery 108 (No in S53), processor 101 decreases the number of target elements used for sound recording, among a plurality of elements 131 of microphone 103, to perform sound recording (S54). For example, processor 101 decreases the number of target elements by switching from the full processing mode to the low power mode.

Processor 101 then determines whether the SNR of the target sound obtained by sound recording is greater than the threshold (S55).

When determining that the SNR of the target sound obtained by sound recording is lower than or equal to the threshold (No in S55), processor 101 adjusts the flight route of unmanned aircraft 100 (S56). For example, processor 101 reduces the distance of the flight route.

When determining that power to be consumed in the current processing mode remains in battery 108 (Yes in S53), processor 101 determines whether power to be consumed using an increased number of target elements for sound recording remains in battery 108 (S57).

When determining that power to be consumed using an increased number of target elements for sound recording remains in battery 108 (Yes in S57), processor 101 increases the number of target elements used for sound recording, among a plurality of elements 131 of microphone 103, to perform sound recording (S58). For example, processor 101 increases the number of target elements by switching from the low power mode to the full processing mode.

When determining that the SNR of the target sound obtained by sound recording is greater than the threshold (Yes in S55), processor 101 determines whether power to be consumed in the current processing mode remains in battery 108 (S59). More specifically, processor 101 performs the same process as that of step S53.

When determining that power to be consumed in the current processing mode does not remain in battery 108 (No in S59), processor 101 adjusts the flight route of unmanned aircraft 100 (S60). For example, processor 101 reduces the distance of the flight route.

When determining in step S57, after performing step S56, step S58, and step S60, that power to be consumed using an increased number of target elements for sound recording does not remain in battery 108 (No in S57), or when determining in step S59 that power to be consumed in the current processing mode remains in battery 108 (Yes in S59), processor 101 returns to step S51.

Effects, Etc.

In unmanned aircraft 100 according to the present embodiment, processor 101 decreases the number of target elements when determining that power to be consumed in the current processing mode does not remain in battery 108. This configuration is thus capable of reducing the amount of power used for signal processing. This reduces the decrease rate of the amount of remaining battery, thus increasing the flight hours of the unmanned aircraft. Meanwhile, processor 101 increases the number of target elements when, for example, the amount of remaining battery becomes greater than a predetermined threshold as a result of charging, etc. This improves the recording quality.

Also, in unmanned aircraft 100 according to the present embodiment, processor 101 further estimates the amount of remaining battery in positions on the obtained flight route at which unmanned aircraft 100 is scheduled to arrive, i.e., waypoints P1 through P4.

With this configuration, it is possible for processor 101 to change the target elements in accordance with the amount of remaining battery estimated from the flight route. For example, it is possible for processor 101 to reduce the decrease rate of the amount of remaining battery by decreasing the number of target elements in the case where the amount of remaining battery is smaller than a predicted amount of power consumption that is predicted to be consumed in the current processing mode to complete the flight through the flight route. The foregoing configuration is thus capable of increasing the flight hours of unmanned aircraft 100. Meanwhile, in the case where the amount of remaining battery is larger than the predicted amount of power consumption, it is possible to increase the number of target elements to a larger number than in the case where the amount of remaining battery is smaller than the predicted amount of power consumption. This improves the recording quality.

In unmanned aircraft 100 according to the present embodiment, it is possible to allocate, to signal processing, the amount of power required to fly through the flight route that has been changed to have a shorter flight distance in the case where the SNR of the target sound signal is estimated to be lower than the threshold. The foregoing configuration is thus capable of increasing the number of target elements, and thus improving the quality of the target sound signal.

In unmanned aircraft 100 according to the present embodiment, processor 101 estimates an SNR of the target sound signal that has been detected using the signals output from the target elements selected in the changing of the target elements. In the case where the estimated SNR is lower than the threshold, processor 101 increases the number of target elements to increase the SNR to be greater than or equal to the threshold. When the determination result in step S45 is "No", for example, processor 101 increases the number of target elements to the original number, thereby improving the SNR. Meanwhile, when the determination result in step S55 is "No", for example, processor 101 adjusts the flight route to have a shorter distance. This enables a predicted amount of power consumption to be calculated next time step S52 is performed to be a smaller amount and thus the determination result in step S53 is more likely to be "Yes". In the case where the determination result in step S53 is "Yes" and the determination result in the subsequent step S57 is "Yes", the number of target elements is increased in in step S58 to perform sound recording. This improves the SNR. Since the number of target elements is increased in the case where the estimated SNR of the target sound signal is lower than the threshold as described above, it is possible to improve the quality of the target sound signal.

Embodiment 3

The following describes Embodiment 3.

Processor 101 of unmanned aircraft 100 according to Embodiment 3 obtains the aircraft state of unmanned aircraft 100, and changes target elements that output signals to be processed among a plurality of elements 131 of microphone 103, in accordance with the aircraft state. The aircraft state is, for example, the number of rotations of rotor blade 111 of each generator 110 of unmanned aircraft 100 per unit time.

FIG. 19 is a graph showing a relation between the noise level of the unmanned aircraft and an instructed number of rotations of the rotor blades.

As shown in the drawing, the level of noise generated by unmanned aircraft 100 increase as an instructed number of rotations of rotor blades 111 increases and consequently the number of rotations of rotor blades 111 per unit time increases. This is because noise of unmanned aircraft 100 is mainly generated by the rotations of rotor blades 111. In view of this, processor 101 may increase the number of target elements used for sound recording among a plurality of elements 131 of microphone 103 to improve the quality of the target sound obtained by sound recording, as the level of noise generated by unmanned aircraft 100 increases.

FIG. 20 is a diagram showing a relation between an instructed number of rotations of the rotor blades of the unmanned aircraft and the number of target elements.

Processor 110 may refer to the relation as shown in FIG. 20 to change target elements in accordance with an instructed number of rotations of rotor blades 111 of unmanned aircraft 100. Processor 101 changes target elements so that the number of target elements increases with an increase in an instructed number of rotations. Note that an instructed number of rotations is indicated, for example, as the ratio of the number of rotations of rotor blades 111 per unit time that is required to obtain thrust to fly unmanned aircraft 100 to the maximum number of rotations of rotor blades 111 per unit time.

Figure 21:
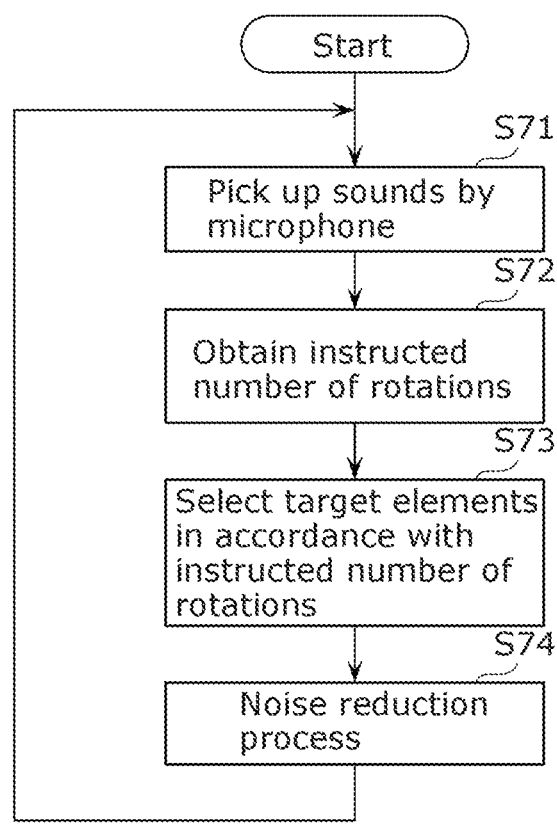
FIG. 21 is a flowchart of an exemplary sound recording operation performed by the unmanned aircraft according to Embodiment 3.

FIG. 21 is a flowchart of an exemplary sound recording operation performed by unmanned aircraft 100 according to Embodiment 3.

In unmanned aircraft 100, microphone 103 picks up sounds (S71).

Processor 101 then obtains an instructed number of rotations (S72). More specifically, processor 101 determines the number of rotations of rotor blades 111 per unit time as the number of rotations that enables generators 110 to generate thrust to perform the flight in accordance with an operation instruction from controller 200 or the flight through the flight route. Processor 101 outputs to generators 110 an instructed number of rotations indicating the determined number of rotations per unit time at which rotor blades 111 are driven.

Processor 101 selects a set of target elements corresponding to the instructed number of rotations having been output shown in the relation in FIG. 20 (S73). For example, processor 101 selects the target elements of Set B when the instructed number of rotations is 55%.

Processor 101 uses the selected set of target elements to perform the noise reduction process (S74).

Effects, Etc.

In unmanned aircraft 100 according to the present embodiment, processor 101 changes target elements that output signals to be processed, in accordance with the aircraft state of unmanned aircraft 100, e.g., the number of rotations of the rotor blades per unit time. It means that processor 101 does not perform the detection process using signals output from some of the elements at least before or after changing the target elements. This configuration reduces processing load required for the detection process at least before or after changing of the target elements, thereby reducing the amount of power required for the detection process. It is also possible to select, as target elements that output signals to be processed, elements appropriate for the number of rotations of the rotor blades per unit time in accordance with such number of rotations. The foregoing configuration thus improves the quality of the result of processing the signals output from the microphone.

Variation

Figure 22:
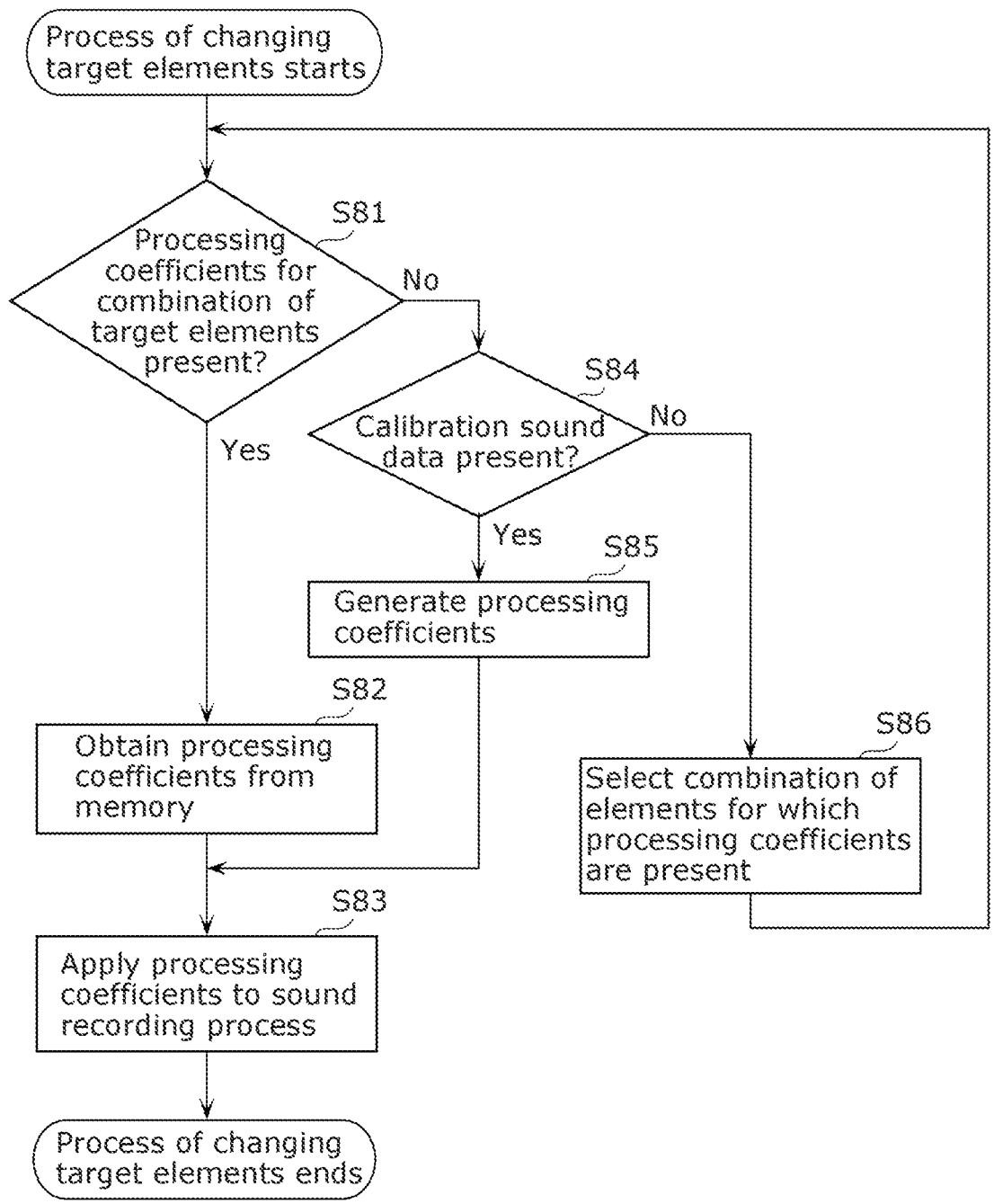
FIG. 22 is a flowchart of an exemplary process of changing target elements according to a variation.

The process of changing target elements in the foregoing embodiments may be performed as in a flowchart shown in FIG. 22. Such process of changing target elements is applicable to the processes of, for example, steps S21, S34, S44, S46, S54, S58, and S73.

FIG. 22 is a flowchart of an exemplary process of changing target elements according to a variation.

Upon start of the process of changing target elements, processor 101 determines whether processing coefficients for a combination of target elements are stored in memory 102 (S81). The processing coefficients are coefficients corresponding to elements in a combination of target elements used for the noise reduction process. The processing coefficients can take different values depending on a combination of target elements.

When determining that the processing coefficients for the combination of the target elements are stored in memory 102 (Yes in S81), processor 101 obtains, from memory 102, the processing coefficients corresponding to such combination of target elements (S82).

Processor 101 then applies, to the sound recording operation, the obtained processing coefficients corresponding to the combination of target elements to perform sound recording (S83). For example, processor 101 applies a coefficient in the processing coefficients corresponding to each of the signals output from the target elements to perform sound recording.

When determining that the processing coefficients for the combination of target elements are not stored in memory 102 (No in S81), processor 101 determines whether calibration sound data for all elements of microphone 103 is stored in memory 102 (S84). The calibration sound data is, for example, data in which white noise is recorded.

When determining that the calibration sound data for all elements of microphone 103 is stored in memory 102 (Yes in S84), processor 101 uses the sound data to generate processing coefficients corresponding to the combination of target elements (S85).

When determining that the calibration sound data for all elements of microphone 103 is not stored in memory 102 (No in S84), processor 101 selects a combination of target elements from a plurality of combinations of elements corresponding to a plurality of processing coefficients stored in memory 102 (S86).

In the foregoing embodiments, processor 101 changes target elements used for sound recording among a plurality of elements 131 of microphone 103, but the present disclosure is not limited to this configuration. Processor 101 may thus change target elements used for sound recording by powering ON or OFF a plurality of elements 131 of microphone 103.

In the foregoing embodiments, processor 101 may also perform in real-time signal processing using signals output from a plurality of elements 131 of microphone 103 or may store such signals output from a plurality of elements 131 of microphone 103 in memory 102 and perform signal processing on the signals stored in memory 102 at a later timing. In this case, processor 101 may store in memory 102 information indicating whether the sound recording processing mode used to obtain the signals stored in memory 102 is the full processing mode or the low power mode, together with these signals.

In the foregoing embodiments, processor 101 changes target elements that output signals to be processed among a plurality of elements 131 of microphone 103, but the present disclosure is not limited to this configuration. Processor 101 may thus adjust a frequency range of the obtained signals from which sound is extracted. The frequency range of the signals from which sound is extracted may be the frequency range of human voice, or may be a frequency range of a specific sound, such as the sound of a whistle. In this case, processor 101 reduces the processing load by performing sound recording after extracting signals in a narrower range than that of the output signals, thereby reducing the power consumption.

To adjust the number of target elements in the foregoing embodiments, for example, the number of target elements may be contiguously adjusted on an element basis or may be adjusted in stages on a basis of a group that includes a plurality of elements. The number of target elements may be adjusted, for example, in n-stages. Stated differently, the number of target elements may be increased or decreased on an element basis or may be increased or decreased in stages on a basis of a group that includes a plurality of elements.

Each of the structural elements in each of the foregoing embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

Although the unmanned aircraft according to one or more aspects of the present disclosure has been described above on the basis of the embodiments, the present disclosure is not limited to such embodiments. Those skilled in the art will readily appreciate that many modifications are possible in the exemplary embodiments without materially departing from the novel teachings and advantages of the present disclosure. Accordingly, all such modifications are intended to be included within the scope of the present disclosure.

Note that machine learning may be utilized for processes, image recognition, and sound recognition performed by processor 101. Examples of machine learning include: supervised learning in which an input-output relationship is studied by use of teaching data, which is input information labeled with output information; unsupervised learning in which data structure is built up only from an unlabeled input; semi-supervised learning in which both labeled and unlabeled data are utilized; and reinforcement learning in which feedback (reward) is obtained to an action selected from the result of state observation to study successive actions that enable the obtainment of the maximum amount of reward. More specific techniques of machine learning include neural-network learning (including deep learning that utilizes multi-layered neural network), genetic programming, decision tree learning, Bayesian network learning, and support vector machine (SVM) learning. The present disclosure uses one of these example techniques.

INDUSTRIAL APPLICABILITY

The present disclosure is applicable for use as an unmanned aircraft and so forth capable of achieving both the reduction in power consumption and the detection of a target sound.

The invention claimed is:

1. An unmanned aircraft, comprising:
a microphone including a plurality of elements; and
a processor that processes signals output from target elements included in the plurality of elements,
wherein the processor:
performs a detection process of detecting a target sound signal of a target sound from the signals output from the target elements included in the plurality of elements; and
changes the target elements that output the signals to be processed by the processor to select at least one target element that outputs a signal to be processed by the processor from among the plurality of elements, in accordance with a result of the detection process.

2. The unmanned aircraft according to claim 1,
wherein the processor increases a current number of the target elements that output the signals to be processed by the processor, when the target sound signal is detected by the detection process from the signals output from the plurality of elements.

3. The unmanned aircraft according to claim 1,
wherein the processor increases a current number of the target elements in changing the target elements, and
before the changing of the target elements, the target elements include a first element located in a specific direction from the microphone.

4. The unmanned aircraft according to claim 3,
wherein the specific direction is a direction in which a sound source of the target sound is predicted to be located.

5. The unmanned aircraft according to claim 3,
wherein before the changing of the target elements, the target elements further include a second element located closer to a source of noise generated by the unmanned aircraft than the first element.

6. The unmanned aircraft according to claim 5,
wherein before the changing of the target elements, the target elements further include a third element located between the first element and the second element.

7. The unmanned aircraft according to claim 1,
wherein in changing the target elements, the processor further changes the target elements to select the at least one target element that outputs the signal to be processed by the processor from among the plurality of elements, in accordance with an amount of remaining battery of a battery included in the unmanned aircraft.

8. The unmanned aircraft according to claim 7,
wherein the processor further:
obtains a flight route of the unmanned aircraft; and
estimates the amount of remaining battery in a position on the flight route at which the unmanned aircraft is scheduled to arrive.

9. The unmanned aircraft according to claim 8,
wherein the processor:
estimates a quality of the target sound signal that is detected from the signal output from the at least one target element that has been selected in the changing of the target elements; and
changes the flight route when the quality is lower than a threshold.

10. The unmanned aircraft according to claim 1,
wherein the processor:
estimates a quality of the target sound signal that is detected from the signal output from the at least one target element that has been selected in changing the target elements; and
increases a current number of the target elements to increase the quality to a level greater than or equal to the threshold, when the quality is lower than the threshold.

* * * * *